US007162435B1

(12) United States Patent
Nagano

(10) Patent No.: US 7,162,435 B1
(45) Date of Patent: Jan. 9, 2007

(54) TRANSACTION MANAGING APPARATUS AND METHOD AND RECORDING MEDIUM STORING TRANSACTION MANAGING PROGRAM THEREIN

(75) Inventor: Aki Nagano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 09/606,211

(22) Filed: Jun. 29, 2000

(30) Foreign Application Priority Data

Oct. 20, 1999 (JP) ................................ 11-298009

(51) Int. Cl.
*G06Q 20/00* (2006.01)
*G07G 1/12* (2006.01)

(52) U.S. Cl. ............................ 705/22; 705/30; 705/24; 705/16; 235/385; 902/22

(58) Field of Classification Search .................. 705/17, 705/16, 21, 22, 30, 24; 235/385; 902/22
See application file for complete search history.

(56) References Cited

U.S. PATENT DOCUMENTS

| 4,713,760 | A | * | 12/1987 | Yamada et al. ............... 705/17 |
| 5,754,655 | A | * | 5/1998 | Hughes et al. ................ 705/70 |
| 5,907,848 | A | * | 5/1999 | Zaiken et al. ................ 707/202 |
| 6,085,168 | A | * | 7/2000 | Mori et al. .................... 705/17 |
| 6,332,133 | B1 | * | 12/2001 | Takayama ..................... 705/39 |
| 6,460,020 | B1 | * | 10/2002 | Pool et al. ..................... 705/26 |
| 2002/0178071 | A1 | * | 11/2002 | Walker et al. ................ 705/26 |

FOREIGN PATENT DOCUMENTS

JP 59231674 A * 12/1984

OTHER PUBLICATIONS

"Transaction Processing Capability Added to Managed E-Commerce -MEC- Application Suite With VirtualNet Certification", Sep. 30, 1999, Business Wire, p. 1423.*

* cited by examiner

*Primary Examiner*—F. Zeender
(74) *Attorney, Agent, or Firm*—Arent Fox PLLC

(57) ABSTRACT

A transaction managing apparatus for a POS terminal has: a transaction defining unit for defining a plurality of kinds of unsettled transaction types by combining a plurality of predetermined categories; and a management control unit for designating one of the plurality of kinds of unsettled transaction types by the interactive operation with the operator and managing and controlling processes in a lump from the start of the transaction to the end. The transaction defining unit defines four kinds of unsettled transaction types by combining at least three items such as sales sum-up timing, presence or absence of necessity of prepayment, and delivering method of goods as categories.

3 Claims, 31 Drawing Sheets

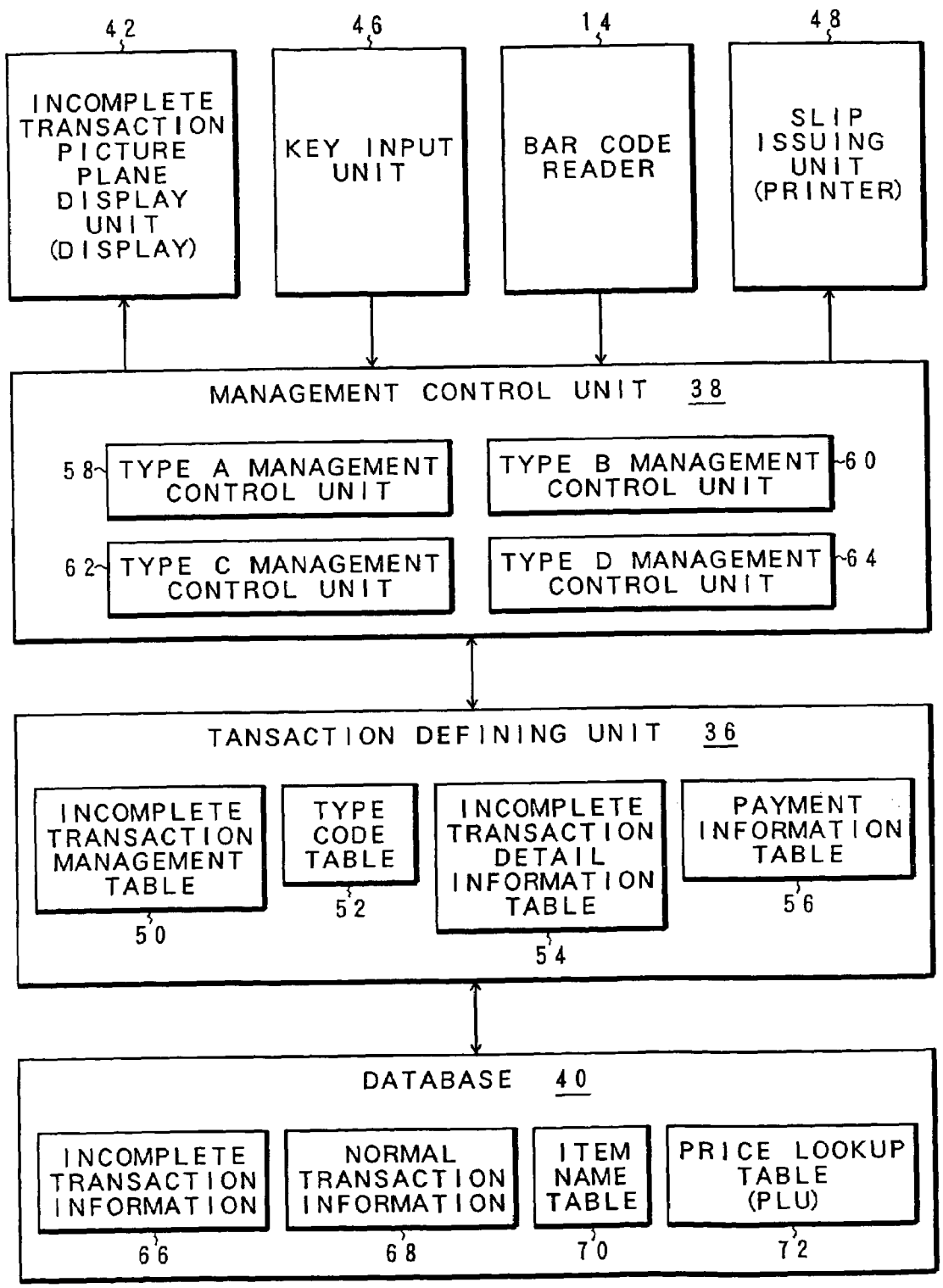

FIG. 5A

74 TYPE CODE TABLE FOR DEFERRED PICKUP TRANSACTION AND ON THE PRINCIPLE OF OCCURRENCE

| TYPE CODE | A |
|---|---|
| SUM-UP TIMING | UPON OCCURRENCE OF TRANSACTION |
| PREPAYMENT NECESSARY /UNNECESSARY FLAG | NECESSARY (TOTAL AMOUNT) |
| DELIVERING METHOD | POSTDELIVERY |
| SCHEDULED DELIVERY DATE | AFTER 5 BUSINESS DAYS |

FIG. 5B

76 TYPE CODE TABLE FOR DEFERRED PICKUP TRANSACTION AND ON THE PRINCIPLE OF COMPLETION

| TYPE CODE | B |
|---|---|
| SUM-UP TIMING | AT THE END OF TRANSACTION |
| PREPAYMENT NECESSARY /UNNECESSARY FLAG | NECESSARY (TOTAL AMOUNT) |
| DELIVERING METHOD | POSTDELIVERY |
| SCHEDULED DELIVERY DATE | AFTER 5 BUSINESS DAYS |

FIG. 5C

78 TYPE CODE TABLE FOR DEFERRED PAYMENT TRANSACTION AND ON THE PRINCIPLE OF OCCURRENCE

| | |
|---|---|
| TYPE CODE | C |
| SUM-UP TIMING | UPON OCCURRENCE OF TRANSACTION |
| PREPAYMENT NECESSARY /UNNECESSARY FLAG | UNNECESSARY |
| DELIVERING METHOD | PREDELIVERY |
| SCHEDULED DELIVERY DATE | APPOINTED DAY |

FIG. 5D

80 TYPE CODE TABLE FOR DEFERRED PAYMENT TRANSACTION AND ON THE PRINCIPLE OF COMPLETION

| | |
|---|---|
| TYPE CODE | D |
| SUM-UP TIMING | AT THE END OF TRANSACTION |
| PREPAYMENT NECESSARY /UNNECESSARY FLAG | UNNECESSARY |
| DELIVERING METHOD | PREDELIVERY |
| SCHEDULED DELIVERY DATE | APPOINTED DAY |

F I G. 6
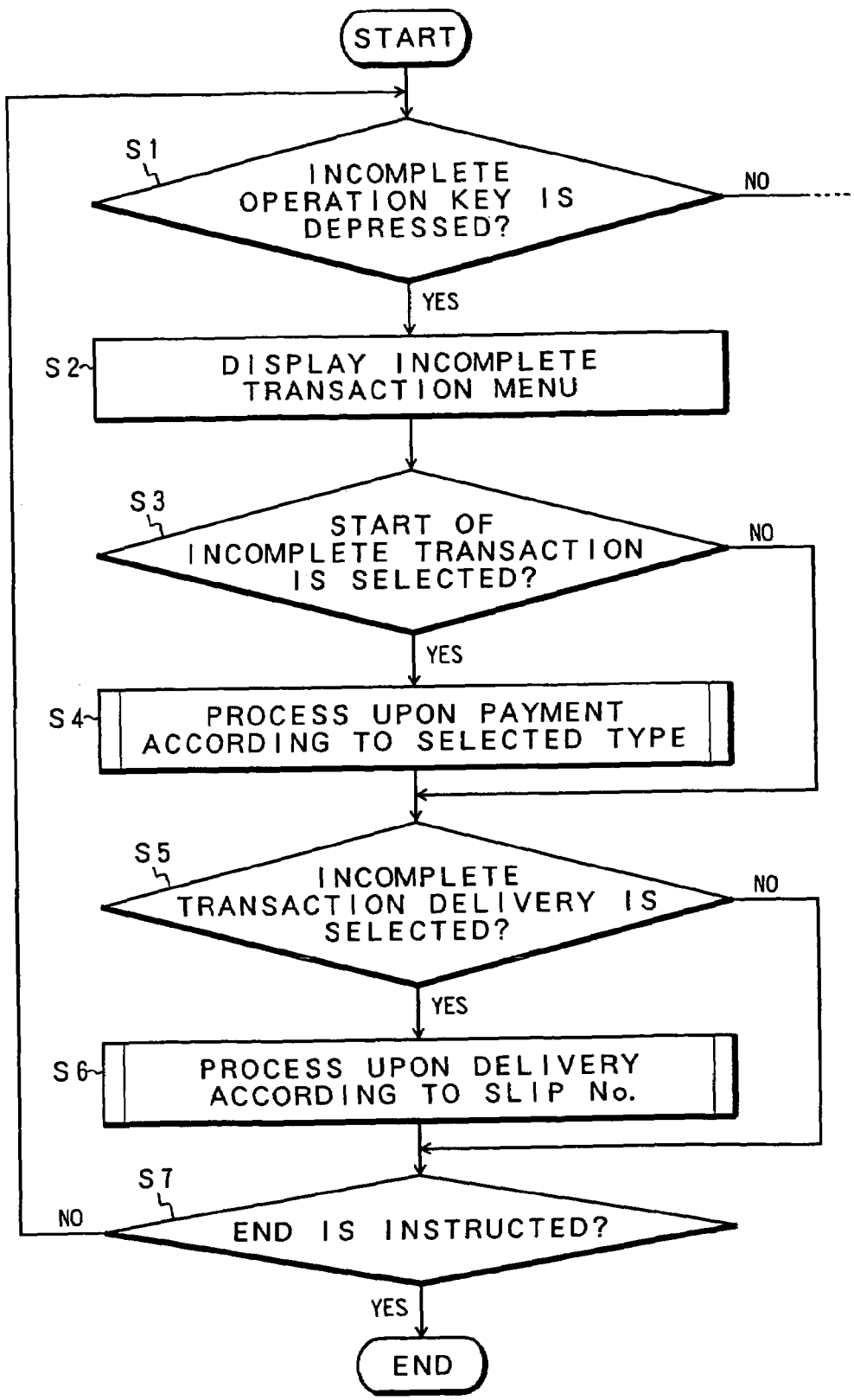

FIG. 8A

SALES REGISTRATION — 82

REGISTER GOODS. — 85

84 — [ | ]

SUBTOTAL ¥0

TAX AMOUNT ¥0

TOTAL ¥0

86 — [ INCOMPLETE ]   [ END ]

FIG. 8B

INCOMPLETE TRANSACTION MENU — 88

90 — ■ TRANSACTION UPON PAYMENT

92 — □ TRANSACTION UPON DELIVERY

[ OK ]   [ CANCEL ]

FIG. 8C

SELECTION OF INCOMPLETE TRANSACTION TYPE

- 96 ■ DEFERRED PICKUP TRANSACTION (ON THE PRINCIPLE OF OCCURRENCE)
- 98 ☐ DEFERRED PAYMENT TRANSACTION (ON THE PRINCIPLE OF OCCURRENCE)
- 100 ☐ DEFERRED PICKUP TRANSACTION (ON THE PRINCIPLE OF COMPLETION)
- 102 ☐ DEFERRED PAYMENT TRANSACTION (ON THE PRINCIPLE OF COMPLETION)

[ OK ]  [ CANCEL ]

FIG. 8D

DEFERRED PICKUP TRANSACTION (ON THE PRINCIPLE OF OCCURRENCE)

INPUT DELIVERY DATE.

106 ─ 19990928

[ OK ]  [ CANCEL ]

FIG. 10A

```
                    SALES REGISTRATION                    82
                                                          85
    REGISTER GOODS.           ┌─────┬──────────┐
 84 ┌─────────────────┐       │     │          │
    │ |               │       ├─────┼──────────┤
    └─────────────────┘       │     │          │
      SUBTOTAL    ¥0          ├─────┼──────────┤
      TAX AMOUNT  ¥0          │     │          │
      TOTAL       ¥0          └─────┴──────────┘

86 ┌─INCOMPLETE─┐  ┌───END───┐
```

FIG. 10B

INCOMPLETE TRANSACTION MENU            88

90 ☐  TRANSACTION UPON PAYMENT
    92 ■  TRANSACTION UPON DELIVERY

┌──OK──┐ ┌─CANCEL─┐

FIG. 10C

```
┌─────────────────────────────────────┐ ← 108
│           DELIVERY                  │
├─────────────────────────────────────┤
│                                     │
│         INPUT SLIP No.              │
│                                     │
│   110 ─┌──────────┐                 │
│        └──────────┘                 │
│                                     │
│                                     │
│                                     │
│                    ┌────┬────────┐  │
│                    │ OK │ CANCEL │  │
│                    └────┴────────┘  │
└─────────────────────────────────────┘
```

FIG. 10D

```
┌──────────────────────────────────────────────┐ ← 112
│   INCOMPLETE TRANSACTION CONFIRMATION        │
│       (DEFERRED PICKUP TRANSACTION           │
│        · ON THE PRINCIPLE OF OCCURRENCE)     │
├──────────────────────────────────────────────┤
│ 114                                          │
│  ↘  SLIP No.               0000001           │
│     SALES DATE             99/09/23          │
│     SALES AMOUNT           ¥18,000           │
│     BALANCE                ¥0                │
│     DELIVERY DATE          99/09/28          │
│     COMPLETION OF PAYMENT    ■ ─116          │
│     DELIVERED                □               │
│                              └─118           │
│                        ┌────┬────────┐       │
│                        │ OK │ CANCEL │       │
│                        └────┴────────┘       │
└──────────────────────────────────────────────┘
```

FIG. 10E

```
                        ┌112
┌─────────────────────────────────┐
│   INCOMPLETE TRANSACTION CONFIRMATION │
│      (DEFERRED PICKUP TRANSACTION     │
│       · ON THE PRINCIPLE OF OCCURRENCE) │
114                                    
  ↘  SLIP No.              0000001
     SALES DATE            99/09/23
     SALES AMOUNT          ¥18,000
     BALANCE               ¥0
     DELIVERY DATE         99/09/28
     COMPLETION OF PAYMENT  ■ ─116
     DELIVERED              ■
                            118

┌─────┬────────┐
                   │ OK  │ CANCEL │
                   └─────┴────────┘
```

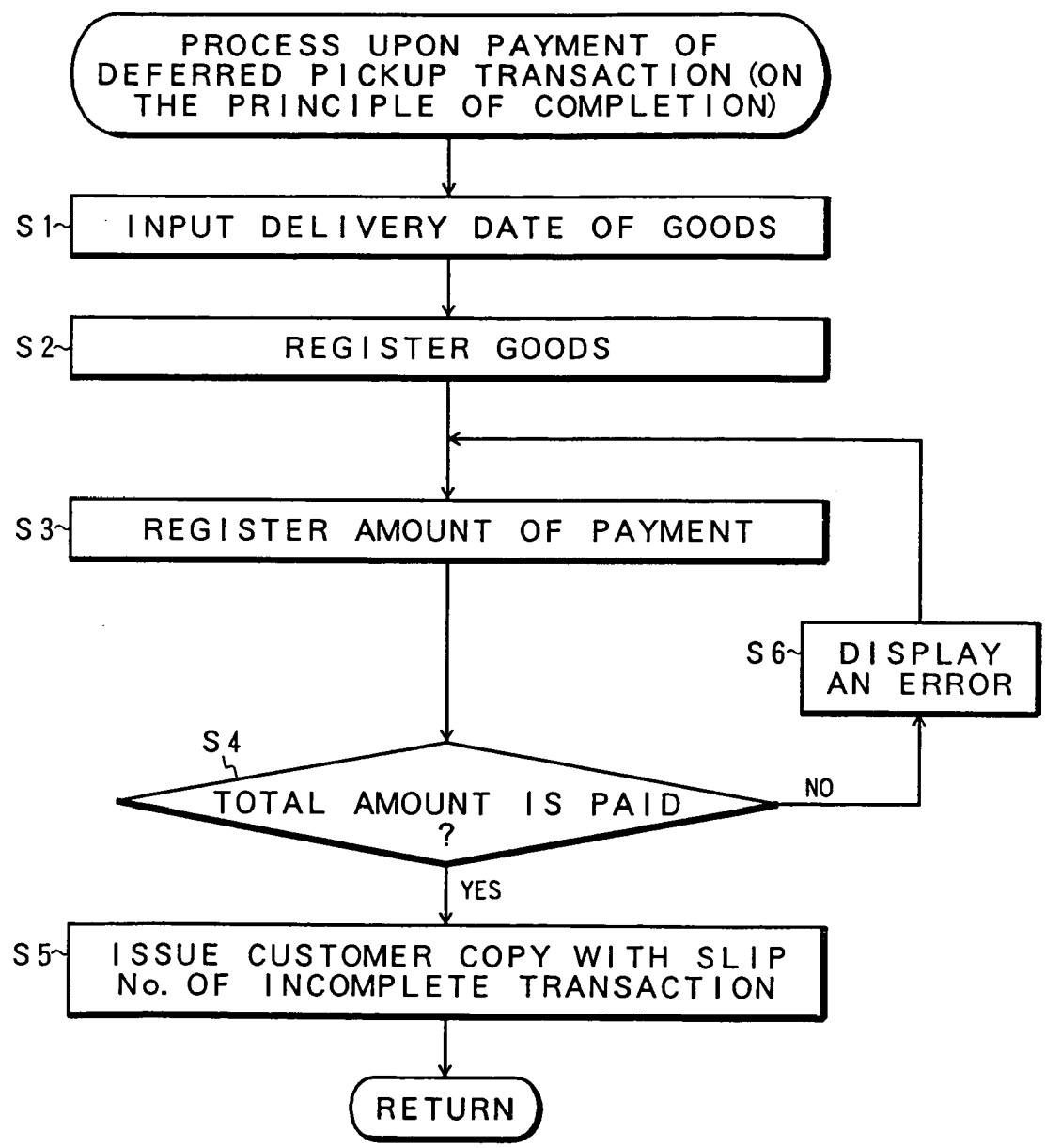

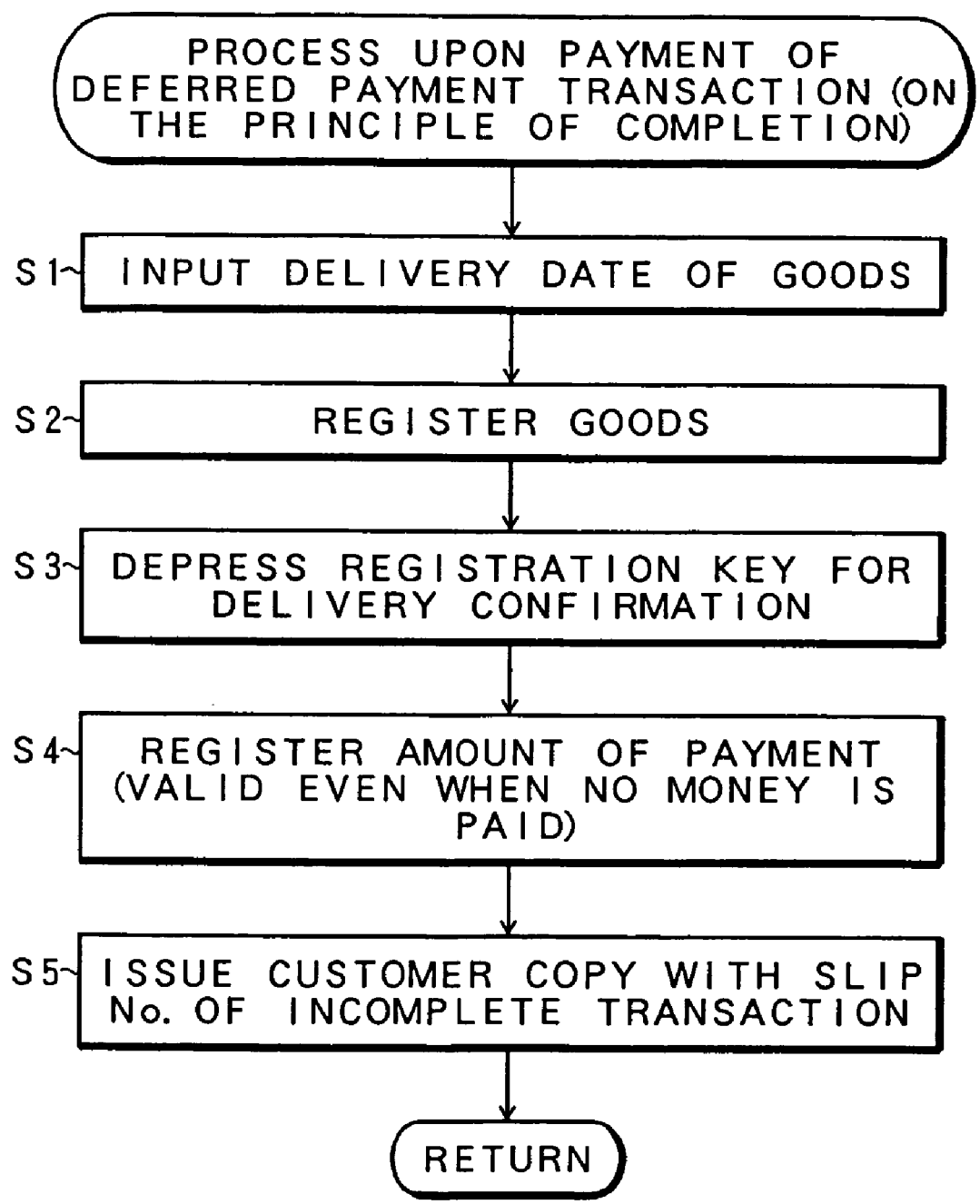

FIG. 14A

```
┌─────────────────────────────────────────┐
│          SALES REGISTRATION             │
├─────────────────────────────────────────┤
│  REGISTER GOODS.          ┌──────┬────┐ │
│  ┌──────────────┐         │      │    │ │
│  │ |            │         ├──────┼────┤ │
│  └──────────────┘         │      │    │ │
│     SUBTOTAL      ¥0      ├──────┼────┤ │
│     TAX AMOUNT    ¥0      │      │    │ │
│     TOTAL         ¥0      └──────┴────┘ │
│                                         │
│                 ┌──────────┐ ┌────────┐ │
│                 │INCOMPLETE│ │  END   │ │
│                 └──────────┘ └────────┘ │
└─────────────────────────────────────────┘
```

FIG. 14B

```
┌─────────────────────────────────────────┐
│        INCOMPLETE TRANSACTION MENU      │
├─────────────────────────────────────────┤
│   ☐   TRANSACTION UPON PAYMENT          │
│   ■   TRANSACTION UPON DELIVERY         │
│                                         │
│                                         │
│                                         │
│                      ┌──────┐ ┌───────┐ │
│                      │  OK  │ │CANCEL │ │
│                      └──────┘ └───────┘ │
└─────────────────────────────────────────┘
```

| SELECTION OF INCOMPLETE TRANSACTION TYPE |
|---|

96~☐ DEFERRED PICKUP TRANSACTION
(ON THE PRINCIPLE OF OCCURRENCE)

98~☐ DEFERRED PAYMENT TRANSACTION
(ON THE PRINCIPLE OF OCCURRENCE)

100~☐ DEFERRED PICKUP TRANSACTION
(ON THE PRINCIPLE OF COMPLETION)

102~■ DEFERRED PAYMENT TRANSACTION
(ON THE PRINCIPLE OF COMPLETION)

[ OK ]  [ CANCEL ]

| DEFERRED PAYMENT TRANSACTION |
| (ON THE PRINCIPLE OF COMPLETION) |

INPUT DELIVERY DATE.

115-1~[ 19990923 ]

[ OK ]  [ CANCEL ]

┌─────────────────────────────────────────────────────┐
│       INCOMPLETE TRANSACTION CONFIRMATION           │
│          (DEFERRED PAYMENT TRANSACTION              │
│           · ON THE PRINCIPLE OF COMPLETION)         │
├─────────────────────────────────────────────────────┤
│                                                     │
│   SLIP No.                     0000002              │
│   SALES DATE                   99/09/23             │
│   SALES AMOUNT                 ¥35,000              │
│   BALANCE                      ¥35,000              │
│   DELIVERY DATE                99/09/23             │
│   COMPLETION OF PAYMENT        ☐                    │
│   DELIVERED                    ☐ — 124              │
│                                                     │
│                                126                  │
│                                                     │
│                          ┌────────┬────────┐        │
│                          │   OK   │ CANCEL │        │
│                          └────────┴────────┘        │
└─────────────────────────────────────────────────────┘
```

FIG. 16A

SALES REGISTRATION — 82

REGISTER GOODS. — 84

SUBTOTAL ¥0
TAX AMOUNT ¥0
TOTAL ¥0

85

86 — INCOMPLETE | END

FIG. 16B

INCOMPLETE TRANSACTION MENU — 88

90 — ☐ TRANSACTION UPON PAYMENT
92 — ■ TRANSACTION UPON DELIVERY

OK | CANCEL

FIG. 16C

```
┌─────────────────────────────────────────┐ 115
│              DELIVERY                   │
├─────────────────────────────────────────┤
│                                         │
│          INPUT SLIP No.                 │
│                                         │
│    120 ─┌──────────┐                    │
│         └──────────┘                    │
│                                         │
│                                         │
│                                         │
│                        ┌─────┬────────┐ │
│                        │ OK  │ CANCEL │ │
│                        └─────┴────────┘ │
└─────────────────────────────────────────┘
```

FIG. 16D

```
┌─────────────────────────────────────────┐ 116-2
│     INCOMPLETE TRANSACTION CONFIRMATION │
│       (DEFERRED PAYMENT TRANSACTION     │
│        · ON THE PRINCIPLE OF COMPLETION)│
├─────────────────────────────────────────┤
│                                         │
│   SLIP No.              0000002         │
│   SALES DATE            99/09/23        │
│   SALES AMOUNT          ¥35,000         │
│   BALANCE               ¥25,000         │
│   DELIVERY DATE         99/09/23        │
│   COMPLETION OF PAYMENT  □              │
│   DELIVERED              ■ ─124         │
│                            126          │
│                                         │
│                        ┌─────┬────────┐ │
│                        │ OK  │ CANCEL │ │
│                        └─────┴────────┘ │
└─────────────────────────────────────────┘
```

┌─────────────────────────────────────────────────────┐
│         INCOMPLETE TRANSACTION CONFIRMATION         │
│            (DEFERRED PAYMENT TRANSACTION            │
│             • ON THE PRINCIPLE OF COMPLETION)       │
├─────────────────────────────────────────────────────┤
│                                                     │
│   SLIP No.                        0000002           │
│   SALES DATE                      99/09/23          │
│   SALES AMOUNT                    ¥35,000           │
│   BALANCE                         ¥0                │
│   DELIVERY DATE                   99/09/28          │
│   COMPLETION OF PAYMENT           ■                 │
│   DELIVERED                       ■ ─124            │
│                                     126             │
│                                                     │
│                            ┌────────┬────────┐      │
│                            │   OK   │ CANCEL │      │
│                            └────────┴────────┘      │
└─────────────────────────────────────────────────────┘
```

INCOMPLETE TRANSACTION LIST
AS OF Oct. 1, 1999

| SLIP No. | DATE AND TIME OF OCCURRENCE | AMOUNT | TYPE |
|---|---|---|---|
| 00000001 | 99.09.23 | 15,000 | DEFERRED PICKUP A |
| 00000022 | 99.09.23 | 24,800 | DEFERRED PICKUP A |
| 00000034 | 99.09.24 | 49,800 | DEFERRED PAYMENT D |
| 00000045 | 99.09.24 | 17,500 | DEFERRED PICKUP A |
| ⋮ | ⋮ | ⋮ | ⋮ |
| 0000241 | 99.09.27 | 115,000 | DEFERRED PAYMENT D |

130

[OK] [CANCEL]

FIG. 19B

UNTAKE-OVER CUSTOMER LIST
AS OF Oct. 1, 1999

| SLIP No. | DATE AND TIME OF OCCURRENCE | SCHEDULED DELIVERY DATE | TYPE |
|---|---|---|---|
| 00000001 | 99.09.23 | 99.09.28 | DEFERRED PICKUP A |
| 00000055 | 99.09.23 | 99.09.28 | DEFERRED PAYMENT D |
| 00000062 | 99.09.24 | 99.09.30 | DEFERRED PICKUP A |
| 00000077 | 99.09.24 | 99.09.30 | DEFERRED PICKUP A |
| ... | ... | ... | ... |
| 00000111 | 99.09.25 | 99.09.30 | DEFERRED PICKUP A |

[ OK ]  [ CANCEL ]

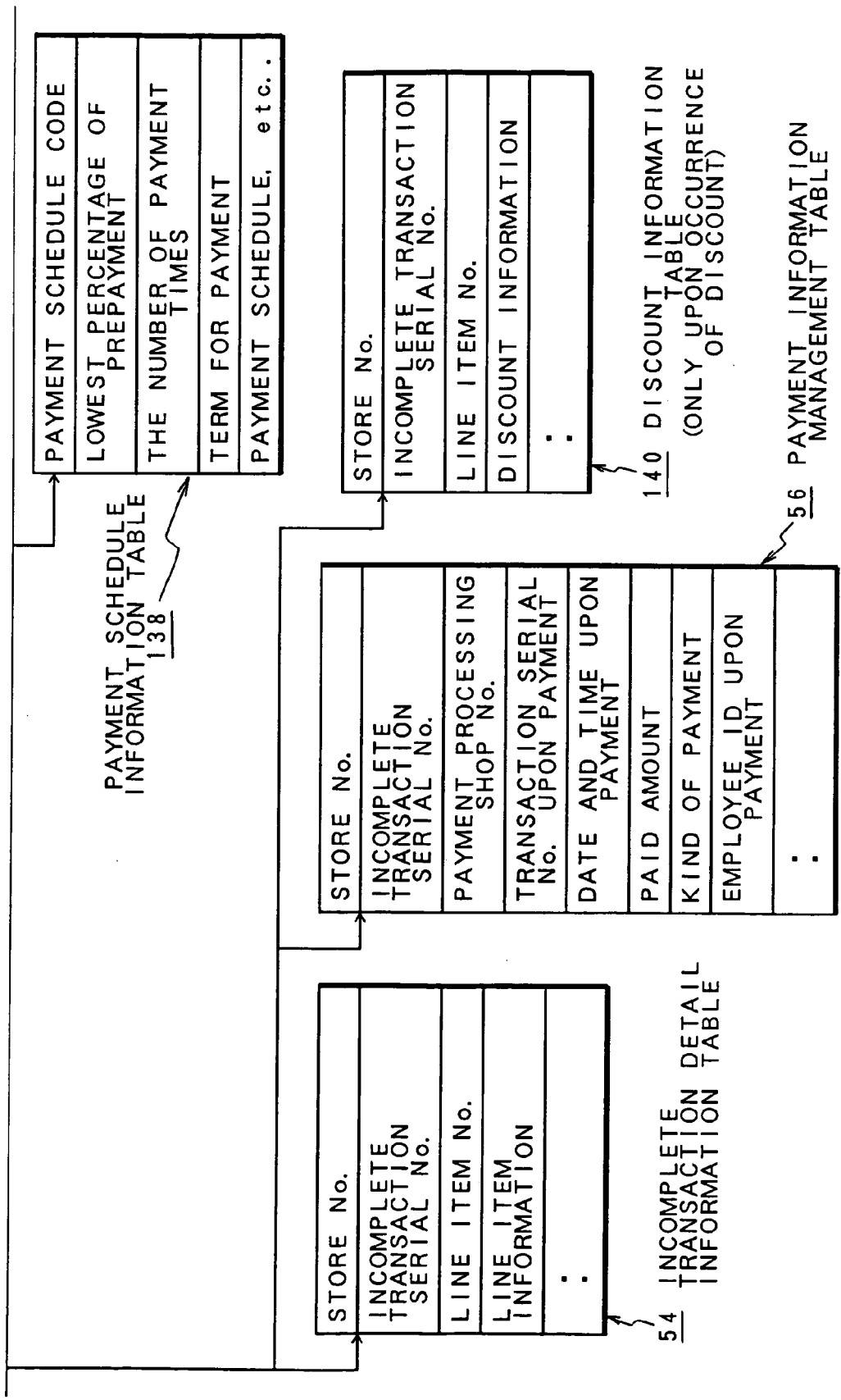

TRANSACTION MANAGING APPARATUS AND METHOD AND RECORDING MEDIUM STORING TRANSACTION MANAGING PROGRAM THEREIN

BACKGROUND OF THE INVENTION

1. Field of the Invention

The present invention relates to a transaction managing apparatus and method which are used for a POS terminal that is used for sales of goods at a store in the distribution retail business, and to a recording medium in which a transaction managing program has been stored. More particularly, the invention relates to a transaction managing apparatus and method for a POS terminal, by which incomplete transactions, such as, deferred pickup transactions wherein the customer prepays for goods and receives them later (e.g., on another day), deferred payment sales wherein goods are previously delivered and the customer pays for them later (e.g., on another day), and the like, are managed and controlled, and to a recording medium in which a transaction managing program has been stored.

2. Description of the Related Art

In addition to normal sales of goods in the distribution retail business, wherein payment for and receipt of goods are simultaneously performed, there are incomplete transactions wherein payment is made as prepayment, postpayment, payment by installments, or the like, and wherein the goods are delivered as predelivery, postdelivery, delivery by installments, or the like. In the incomplete transaction, when the transaction is started with the prepayment or the predelivery of goods, the contents of the transaction are continuously managed until the delivery of the goods or the payment is completed. As for the incomplete transaction, the timing to sum up the sale (transaction amount) may be set to the start of the transaction or the end of the transaction (at the time of completion of the payment of the balance or at the time of the delivery of goods). Thereafter, it is necessary to sum up the sales at the determined timing.

However, in the conventional sales of goods, systems are provided for POS terminals in accordance with the kinds of incomplete transactions, such as, transaction of prepayment and postdelivery of goods, transaction of predelivery of goods and postpayment, and the like. Each of these systems individually manages its respective transactions and incomplete transactions are managed on the basis of transaction slips independently of such systems.

Therefore, the management of all of the incomplete transaction types understanding the situations, and the like, takes a long time, is difficult, and raises a possibility of improper management.

SUMMARY OF THE INVENTION

According to the present invention, there is provided a transaction managing apparatus for a POS terminal wherein management of all of the incomplete transaction types, understanding situations thereof, and the like, can be correctly performed in a short time and the kind of incomplete transaction can be correctly changed in a short time.

A transaction managing apparatus for a POS terminal according to the present invention includes a transaction defining unit for defining a plurality of incomplete transaction types by combining a plurality of predetermined categories and a management control unit for designating one of the plurality of incomplete transaction types and managing and controlling the transaction from the start to the end thereof by interactive operation with the operator. Therefore, according to the present invention, the plurality of incomplete transaction types can be controlled and managed by one system so that the management of all of the incomplete transactions, the understanding of situations thereof, and the like, can be correctly performed in an extremely short time. It is also possible to correctly change the control and management of the incomplete transaction in a short time merely by changing the designation of the incomplete transaction type.

The following categories define the incomplete transaction types.

(1) Method of tender, such as, prepayment, postpayment, payment by installments, or the like.

(2) Setting the requirement for prepayment. For required prepayments, the lowest percentage, the lowest amount, or the like, is set.

(3) Term for payment.

(4) Delivery method, such as, predelivery, postdelivery, delivery by installments, or the like.

(5) Scheduled delivery date in case of predelivery, postdelivery, or the like.

(6) Setting of permission/inhibition for predelivery. For example, when a paid amount does not reach the price of the goods, whether or not the delivery is possible is set.

(7) Setting the sales sum-up timing of the sale (transaction) amount with amounts from other transactions to the start of the transaction, the completion of the payment, the completion of the transaction, or the like.

The transaction defining unit of the present invention defines the incomplete transaction types by combining at least three items: the sales sum-up timing, the presence or absence of necessity of the prepayment, and the timing or method of delivering goods.

As incomplete transaction types, for example, the transaction defining unit defines at least one of the following types A, B, C, and D.

Type A: Deferred pickup (delivery) transaction on the principle of occurrence in which the sale (transaction amount) is summed up with other transaction amounts upon occurrence (start) of a transaction with a total amount required as a prepayment.

Type B: Deferred pickup (delivery) transaction on the principle of completion in which the sale (transaction) amount is summed up with other transaction amounts upon completion of a transaction (e.g., upon delivery) with the total amount required as a prepayment.

Type C: Deferred payment transaction on the principle of occurrence in which the sale (transaction) amount is summed up with other transaction amounts upon occurrence (e.g., at the beginning) of a transaction of deferred payment sales with a specific customer.

Type D: Deferred payment transaction on the principle of completion in which the sale (transaction) amount is summed up with other transaction amounts upon completion of a transaction (e.g., when payment is complete) of the deferred payment sales with a specific customer.

As for the deferred pickup (delivery) transaction on the principle of occurrence (i.e., type A), the transaction defining unit forms type code information having a combination of the categories in which the sales sum-up timing is set to the timing upon occurrence (start) of the transaction, to the timing at which the prepayment of a total amount is necessary, and to the timing at which the delivery of goods is performed later (e.g., on another day). When the incomplete transaction of type A as a deferred pickup (delivery) transaction on the principle of occurrence is designated, the management control unit executes a prepaying process at the start of the transaction and a delivery process upon completion of the transaction. That is, as processes upon prepayment at the start of the transaction, the following processes are executed: an issue of a transaction slip number of the incomplete transaction; an input of a delivery date of goods; a registration of goods; a registration of an amount of payment; a confirmation of the payment of the total amount; a display of an error in the case where the payment is not made yet; issuance of a customer copy with the transaction slip number; and a sum-up of the sale (transaction) amount with other transaction amounts. As processes upon delivery at the time when the transaction is completed, a display of incomplete transaction information by the input of the slip number, a registration of the delivery, and a termination of the incomplete transaction are executed.

As for the deferred pickup transaction on the principle of completion (i.e., type B), the transaction defining unit forms type code information having a combination of categories: a first category wherein the sales sum-up timing is set to the timing upon completion of the transaction; a second category wherein the prepayment of a total amount is necessary; and a third category wherein the delivery of goods is set to postdelivery. When the incomplete transaction of the type B as a deferred pickup transaction on the principle of completion is designated, the management control unit performs the prepaying process at the start of the transaction and the delivering process upon completion of the transaction. That is, as processes upon prepayment at the start of the transaction, the following processes are executed: namely, issuance of a transaction slip number of the incomplete transaction; an input of a delivery date of goods; a registration of goods; a registration of an amount of payment; a confirmation of the total amount of payment; a display of an error in the case where the payment is not made yet; and an issuance of a customer copy with the transaction slip number. As processes upon delivery at the end of the transaction, a display of incomplete transaction information by the input of the slip number, a registration of the delivery, a sum-up of the sale (transaction) amount with other transaction amounts, and a termination of the incomplete transaction are executed. The type B differs from the type A only with respect to the sales sum-up timing. The timing in type A is set to the start of the transaction and in the type B is set to the completion of the transaction.

With respect to the deferred payment transaction on the principle of occurrence (type C), the transaction defining unit forms type code information having a combination of categories: a first category wherein the sales sum-up timing is set to the timing upon occurrence (start) of the transaction; a second category wherein the prepayment is unnecessary; and a third category wherein the delivery of goods is set to a predelivery. When the type C incomplete transaction, a deferred payment transaction on the principle of occurrence is designated, the management control unit executes the prepaying process at the start of the transaction and the process upon payment. That is, as processes upon prepayment at the start of the transaction, the following processes are executed: namely, issuance of a transaction slip number of the incomplete transaction; an input of a delivery date of goods; a registration of goods; a registration of an amount of payment including a zero amount; issuance of a customer copy with the transaction slip number; a registration of a delivery; and a sum-up of the sale (transaction) amount with other transaction amounts. As processes upon payment, a display of incomplete transaction information by the input of the transaction slip number, a registration of the amount of payment, and a termination of the incomplete transaction in the case where a balance is equal to 0 are executed.

As for the deferred payment transaction on the principle of completion (i.e., type D), the transaction defining unit forms type code information having a combination of categories: a first category wherein the sales sum-up timing is set to the timing upon completion of the transaction; a second category wherein the prepayment is unnecessary; and a third category wherein the delivery of goods is set to a predelivery. When the incomplete transaction of the type D, a deferred payment transaction on the principle of completion, is designated, the management control unit executes the prepaying process at the start of the transaction and the process upon payment. In other words, as processes upon prepayment at the start of the transaction, the following processes are executed: namely, issuance of a transaction slip number of the incomplete transaction; an input of a delivery date of goods; a registration of goods; a registration of an amount of payment including a zero amount; a registration of a delivery; and issuance of a customer copy with the transaction slip number. As processes upon payment, the following processes are executed: namely, a display of incomplete transaction information by the input of the transaction slip number; a registration of the amount of payment; a sum-up of the sale (transaction) amount with other transaction amounts in the case where a balance is equal to 0; and termination of the incomplete transaction. The type C differs from the type D only in that the sales sum-up timing in the type C is set to the start of the transaction and in the type D is set to the completion of the transaction.

The transaction defining unit has, for example, an incomplete transaction management table, a type code table, an incomplete transaction line item information table, and a payment information management table. The incomplete transaction management table stores basic management information, such as, store number, incomplete transaction slip number, type code, transaction serial number upon occurrence, date and time of occurrence, customer number, requested amount, amount of down payment, balance, scheduled delivery date, delivery completion flag, sum-up possible/impossible flag, totalization completion flag, and the like. The type code table is designated by the type code in the incomplete transaction management table and stores category combination information, such as, sales sum-up timing, prepayment necessary/unnecessary flag, predelivery possible/impossible flag, method of tender, delivery method, and the like. The incomplete transaction detail information table is designated by the incomplete transaction slip number in the incomplete transaction management table and stores goods management information, such as, goods code, unit price, quantity, discount information, and the like. Further, the payment information management table is designated by the incomplete transaction slip number in the incomplete transaction management table and stores payment management information, such as, date and time (time stamp) of payment, paid amount, kind of tender, and the like. On the basis of each table information of the transaction defining unit, the management control unit displays the following lists: a list showing the incomplete transactions; a list of the customers who do not come to receive goods even after the scheduled delivery date; a list of the customers who do not come to pay after the term of payment; a list of the payment situations; and the like. As information that is stored in each table, each table does not need to have all of the information that is listed, but the invention includes a case where the table has proper storage contents, as necessary. According to the present invention, there is provided a transaction managing method for a POS terminal comprising the steps of: defining a plurality of kinds of incomplete transaction types by combining a plurality of predetermined categories, designating one of the plurality of kinds of incomplete transaction types by interactive operation with the operator, and managing and controlling processes from the beginning of the transaction to the end.

According to the present invention, there is provided a recording medium which stores a management control program, wherein the management control program comprises the steps of: defining a plurality of kinds of incomplete transaction types by combining a plurality of predetermined categories; designating one of the plurality of kinds of incomplete transaction types by interactive operation with the operator; and managing and controlling processes from the beginning of the transaction to the end.

The present invention provides a transaction system. A plurality of terminal apparatuses are connected through a network to a server for managing transaction information, and each of those terminal apparatuses comprises: a transaction defining unit for defining a plurality of kinds of incomplete transaction types by combining a plurality of predetermined categories and a management control unit for designating one of the plurality of kinds of incomplete transaction types by interactive operation with the operator and managing and controlling processes from the beginning of the transaction to the end.

The above, and other objects, features, and advantages of the present invention will become more apparent from the following detailed description with reference to the drawings.

BRIEF DESCRIPTION OF THE DRAWINGS

FIG. 3 is a block diagram of a functional construction of the POS terminal according to the invention;

FIGS. 5A to 5D are explanatory diagrams of incomplete transaction types defined in the POS terminal in FIG. 3;

FIG. 6 is a flowchart for an incomplete transaction process by the POS terminal in FIG. 3;

FIGS. 8A to 8D are explanatory diagrams of operation picture planes in the paying process in FIG. 7;

FIGS. 10A to 10E are explanatory diagrams of operation picture planes in the delivering process in FIG. 9;

FIG. 11 is a flowchart for a paying process in the deferred pickup transaction on the principle of completion (type B);

FIG. 13 is a flowchart for a paying process in a deferred payment transaction on the principle of completion (type D);

FIGS. 14A to 14E are explanatory diagrams of operation picture planes in the paying process in FIG. 13;

FIGS. 16A to 16E are explanatory diagrams of operation picture planes in the paying process in FIG. 15;

FIGS. 19A and 19B are explanatory diagrams of a display of list picture planes in the incomplete transaction; and FIGS. 20A and 20B are explanatory diagrams of another embodiment of a table structure provided for the transaction defining unit in FIG. 4.

DETAILED DESCRIPTION OF THE PREFERRED EMBODIMENT

Figure 1:
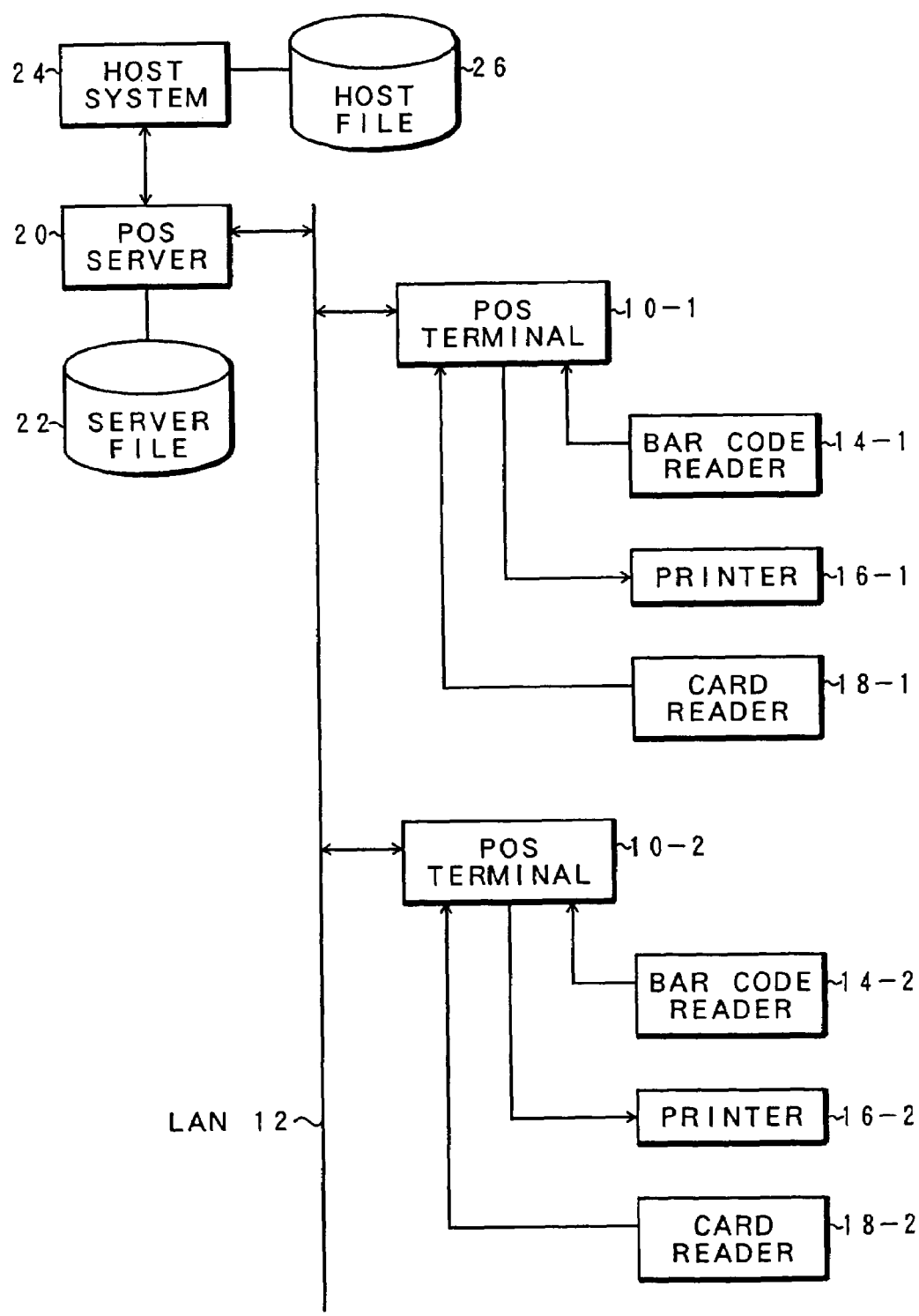
FIG. 1 is an explanatory diagram of a POS system to which the invention is applied.

FIG. 1 is an explanatory diagram of a POS system (point of service system) to which the transaction managing apparatus and method of the present invention are applied. The POS system comprises a plurality of POS terminals 10-1 and 10-2, a LAN 12, a POS server 20, a server file 22, a host system 24, and a host file 26. Input/output apparatuses for POS, such as, bar code readers 14-1 and 14-2, printers 16-1 and 16-2, card readers 18-1 and 18-2, and the like, are provided for the POS terminals 10-1 and 10-2, as necessary. FIG. 1 shows an example of the POS system of a large scale. For a POS system of a middle scale, the system is constructed by the POS server 20, server file 22, and POS terminals 10-1 and 10-2. Further, for a system of a small scale, such as, a private store or the like, the POS system is constructed only by the POS terminals 10-1 and 10-2. Such a POS system is installed in a store, or the like, of the distribution retail business; performs a settlement by cash, credit card, or the like, in association with a purchase of goods; and sums up a result of settlement. In the present invention, each of the POS terminals 10-1 and 10-2 has a function to perform management and control with respect to what are called incomplete transactions wherein the payment, the delivery of goods, and the like, are performed at different dates/hours in addition to the normal transaction wherein the settlement of payment and the receipt of goods are performed at the time of purchase.

Figure 2:
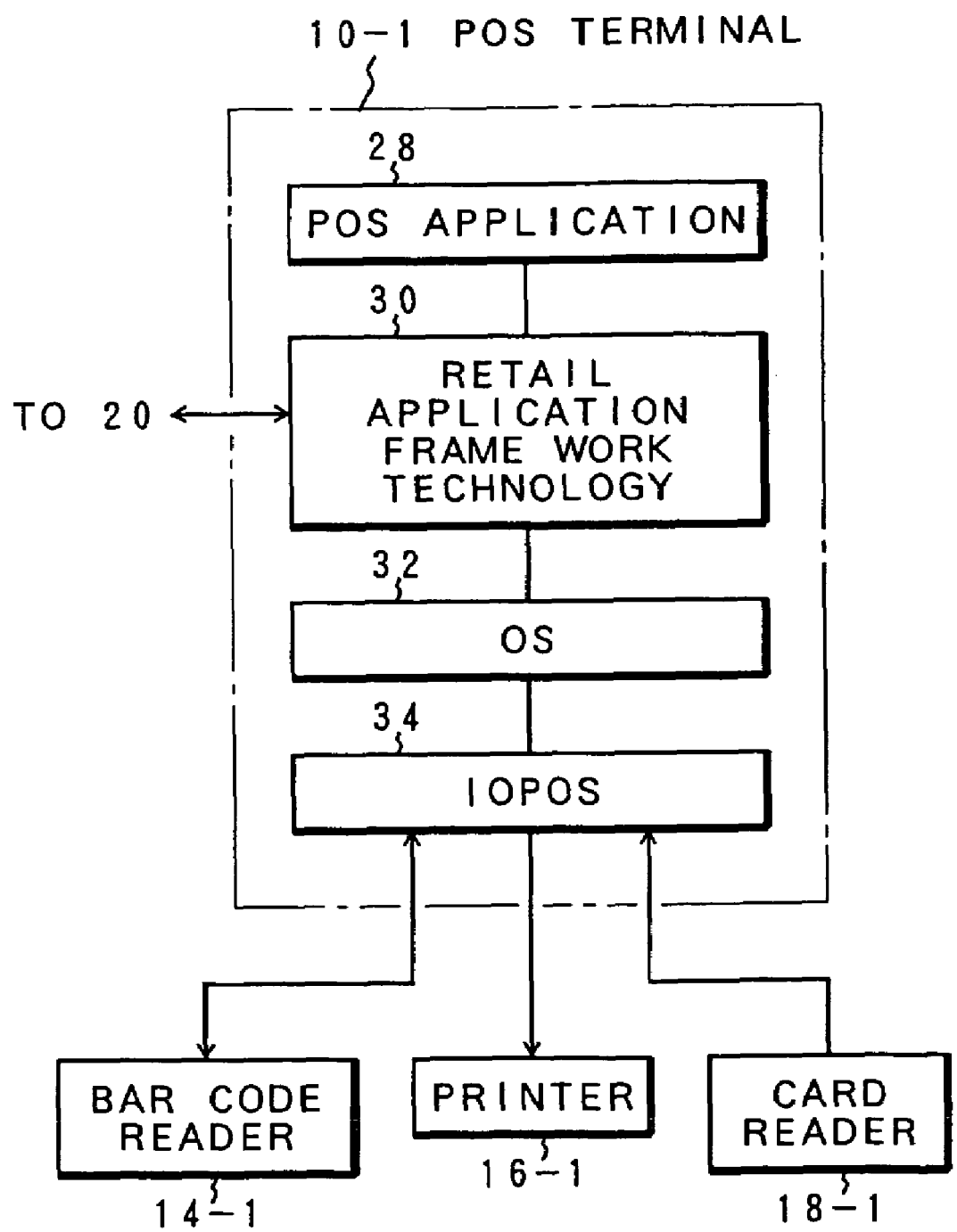
FIG. 2 is an explanatory diagram of a program structure of a POS terminal in FIG. 1.

FIG. 2 illustrates an example of a program structure of the POS terminal 10-1 in FIG. 1. The POS terminal 10-1 is provided with: a POS application 28; a retail application frame work technology 30 as middle software; an OS 32; and an IOPOS 34 for standardizing the input/output apparatuses for the purpose of POS. The bar code reader 14-1, printer 16-1, and card reader 18-1 are connected to the IOPOS 34, thereby enabling the bar code reader, printer and card reader to be handled as standardized input/output apparatuses as compared with the retail application frame work technology 30. The retail application frame work technology 30 also communicates with the POS server 20 in FIG. 1. The function of the transaction managing apparatus for an incomplete transaction according to the present invention is realized by the retail application frame work technology 30 and POS application 28 in the POS terminal 10-1 in FIG. 2.

FIG. 3 is a block diagram of a functional construction of the transaction managing apparatus according to the present invention which is provided for the POS terminals 10-1 and 10-2 in FIG. 1 and is used for managing and controlling all types of incomplete transactions. The transaction managing apparatus of the present invention is constructed by a transaction defining unit 36 and a management control unit 38. A database 40 is provided for the transaction defining unit 36. Input/output apparatuses, such as, incomplete transaction picture plane display unit 42, key input unit 46, bar code reader 14, transaction slip issuing unit 48, and the like, are provided for the management control unit 38. When considering the correspondence with the program structure in FIG. 2, the function of the transaction defining unit 36 is realized by the retail application frame work technology 30 and the management control unit 38 is realized by the POS application 28. The transaction defining unit 36 defines a plurality of kinds of incomplete transaction types by combining a plurality of predetermined categories with respect to the incomplete transaction. In association with the definition of the incomplete transaction types, an incomplete transaction management table 50, a type code table 52, an incomplete transaction detail information table 54, and a payment information management table 56 are provided for the transaction defining unit 36. Among them, the type code table 52 functions as a definition table in which a plurality of kinds of incomplete transaction types are defined by combining a plurality of categories. The management control unit 38 designates one of the incomplete transaction types defined by the transaction defining unit 36 by interactive operation with the operator and manages and controls processes from the beginning of the transaction to the end. In the embodiment, in the transaction defining unit 36, since it is assumed that four types A, B, C, and D are defined as an example, a type A management control unit 58, a type B management control unit 60, a type C management control unit 62, and a type D management control unit 64 are provided for the management control unit 38. Further, incomplete transaction information 66 and normal transaction information 68 are provided for the database 40. Each transaction information formed by the transaction operation of the POS terminal is recorded. An item name table 70 and a price lookup table (PLU) 72 are provided for the database 40. The item name table 70 is constructed by an item number code and an item name. The item number code and the item name can be recognized with reference to the item name table 70 based on the code read out by the bar code reader 14. The price lookup table 72 is constructed by the item number code and the price. Therefore, the price can be recognized by viewing the price lookup table 72 on the basis of the item number code derived with reference to the item name table 70.

Figure 4A:
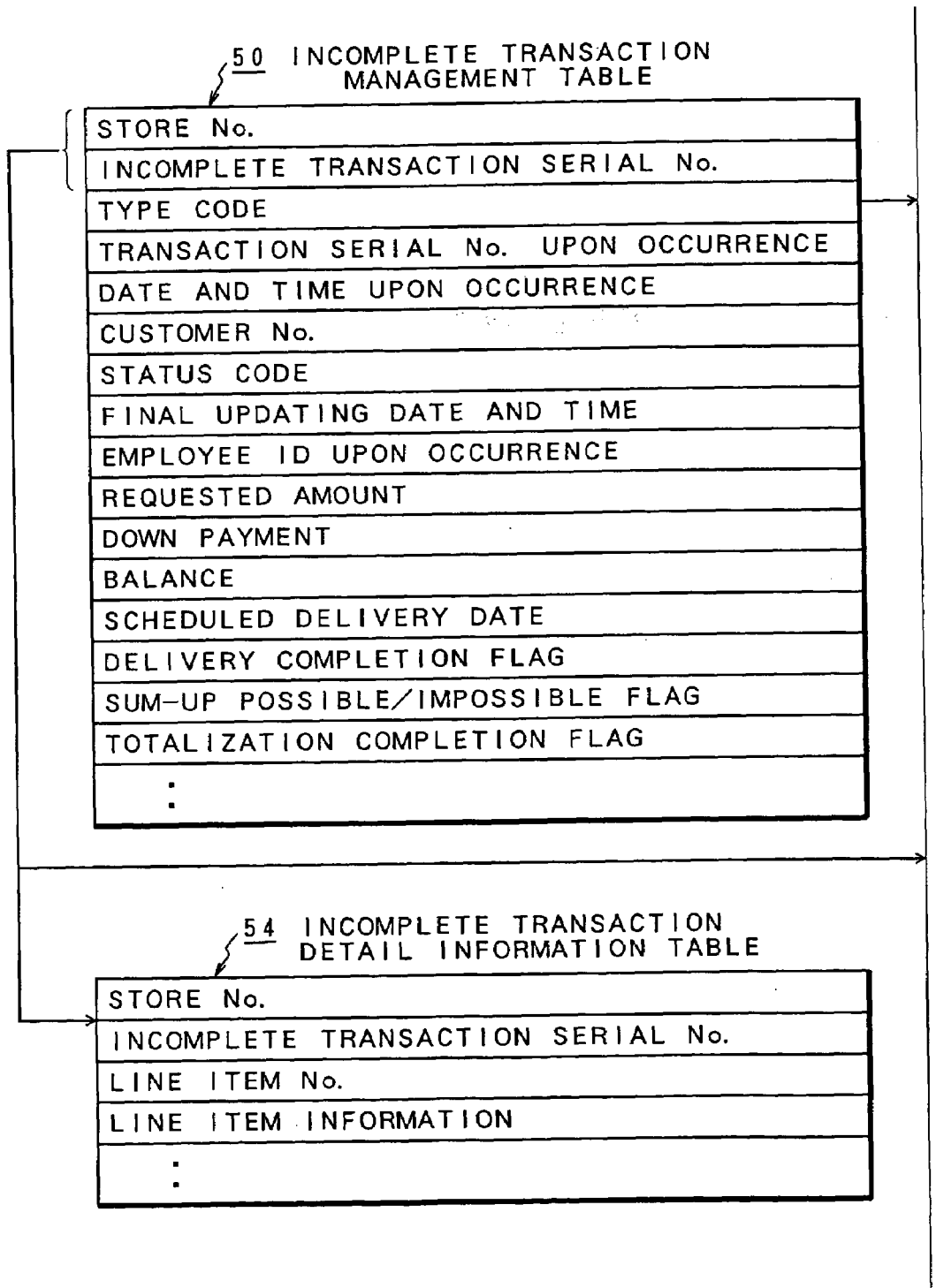
FIGS. 4A and 4B are explanatory diagrams of a table structure provided for a transaction defining unit in FIG. 3.
Figure 4B:
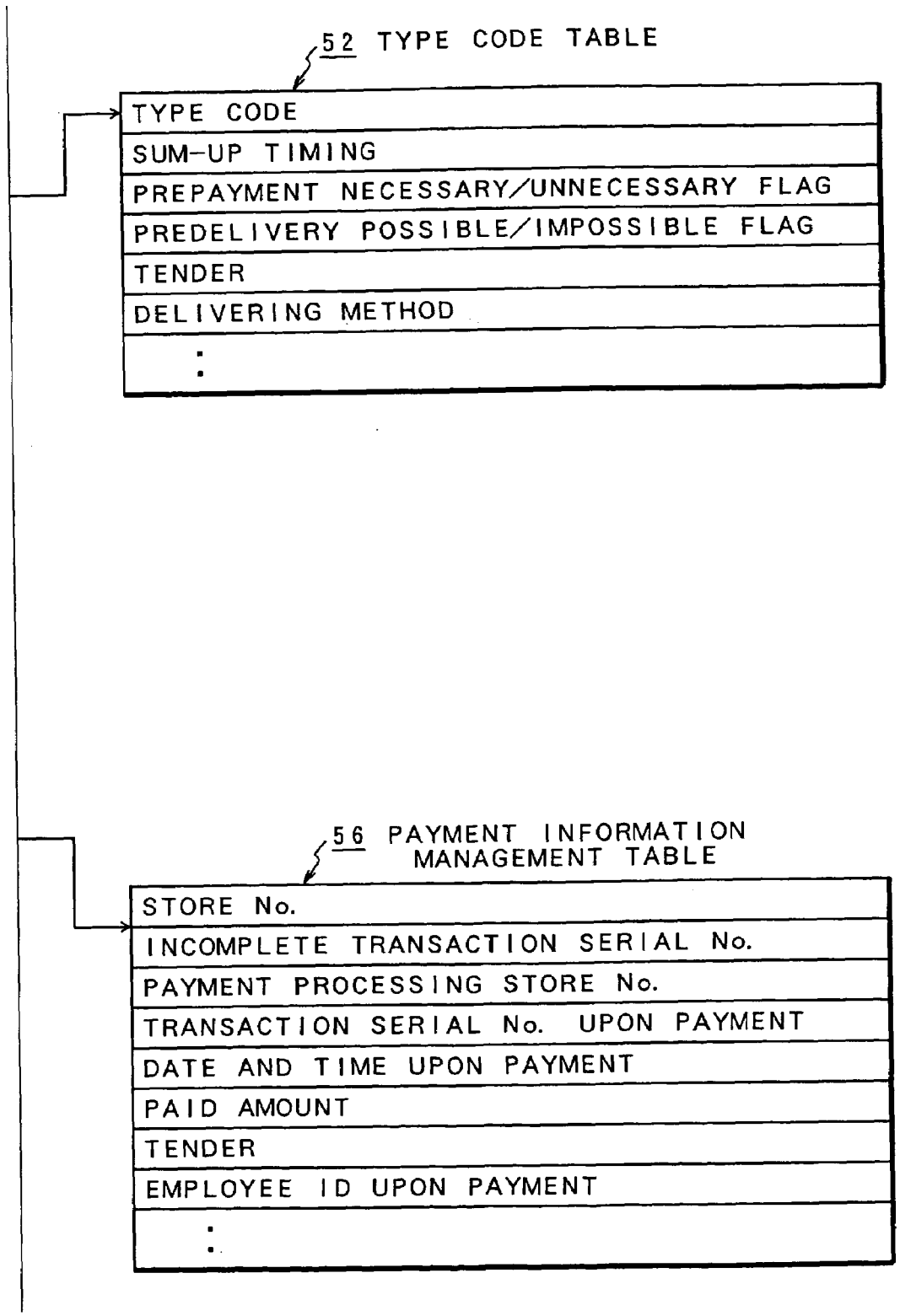

FIGS. 4A and 4B are explanatory diagrams of the details of each table provided for the transaction defining unit 36 in FIG. 3 and its link structure. The incomplete transaction management table 50 has basic information for incomplete transactions. That is, the incomplete transaction management table 50 is provided with: a store number; an incomplete transaction serial number (incomplete transaction slip number); a type code indicative of an incomplete transaction type; a transaction serial number upon occurrence, date and time of occurrence; a customer number; a status code; final updating date and time; an employee ID upon occurrence; a requested amount; an amount of down payment; a balance; a scheduled delivery date; a delivery completion flag; a sum-up possible/impossible flag; a totalization completion flag; and the like. The incomplete transaction detail information table 54 and payment information management table 56 can be referred to on the basis of the store number and the incomplete transaction serial number in the incomplete transaction management table 50. A store number, an incomplete transaction serial number, a line item number, line item information, and the like, have been stored in the incomplete transaction detail information table 54. A store number, an incomplete transaction serial number, a payment processing store number, a transaction serial number upon payment, date and time of payment, a paid amount, a kind of tender, an employee ID upon payment, and the like, have been stored in the payment information management table 56. The type code table 52 can be referred to on the basis of the type code in the incomplete transaction management table 50. The type code table 52 is a table for defining a plurality of kinds of incomplete types by combining a plurality of predetermined categories in the transaction defining unit 36 in FIG. 3. In the embodiment, a plurality of categories, such as, type code, sum-up timing, payment necessary/unnecessary flag, predelivery possible/impossible flag, method of tender, delivery method, and the like, are provided in the type code table 52. The type of incomplete transaction is determined by a combination of those categories. Each category in the type code table 52 will now be described as follows. First, a timing at the start of the transaction, a timing upon completion of the payment, a timing upon completion of the delivery, and the like, can be set as sum-up timings. The prepayment necessary/unnecessary flag is used to set the presence or absence of the necessity of the prepayment in the incomplete transaction. In this case, if the prepayment is necessary, the lowest percentage, the lowest amount, or the like, can be set. The predelivery possible/impossible flag is a flag for setting whether the predelivery of goods is possible or not. For example, when the paid amount does not reach the goods price, a condition about whether the predelivery is possible or not, or the like, is set. A prepayment, a postpayment, a payment by installments, or the like, are set as methods of tender. Predelivery, postdelivery, delivery by installments, or the like, are delivery methods. A scheduled delivery date also can be set in association with the delivery method. As for the scheduled delivery date, an appointed day is set in case of predelivery and a date determined as a default, for example, a date after five business days, or the like, is set in case of postdelivery. Among those categories in the type code table 52, there are the following items as minimum categories necessary for incomplete transactions in the present invention.

I. sum-up timing

II. prepayment necessary/unnecessary flag

III. delivering method

The type of incomplete transaction can be defined by combining the other categories with those three basic categories as necessary.

FIGS. 5A to 5D are explanatory diagrams of a type code table in which four types A, B, C, and D have been defined as types of incomplete transactions.

FIG. 5A shows a type code table 74 for the deferred pickup transaction and on the principle of occurrence corresponding to type A. The incomplete transaction of the type A is an unsettled transaction of the prepayment of a total amount and is a deferred pickup (delivery) transaction on the principle of occurrence in which the sale (transaction) amount is summed up with other transaction amounts upon occurrence (start) of the transaction. Therefore, in the type code table 74 for the deferred pickup transaction and on the principle of occurrence, the type code A is first defined. Subsequently, "upon occurrence of transaction" is defined as a sum-up timing; "necessary" is defined as a prepayment necessary/unnecessary flag; "total amount" is defined as attribute information; and "postdelivery" is defined as a delivery method. Thus, the type designation of the incomplete transaction by the three basic categories is performed. Further, "after 5 business days" is set as a default of the scheduled delivery date.

FIG. 5B is an explanatory diagram of a type code table 76 wherein the incomplete transaction of the type B is defined. The incomplete transaction of the type B is an incomplete transaction of the prepayment of a total amount and is a deferred pickup (delivery) transaction on the principle of completion wherein the sale (transaction) amount is summed up with other transaction amounts upon completion of the transaction. Therefore, in the type code table 76 for the deferred pickup transaction and on the principle of completion, the type code B is first defined. Subsequently, "at the end of transaction" is defined as a sum-up timing. The subsequent prepayment necessary/unnecessary flag, delivery method, and scheduled delivery date are the same as those in the type code table 74 in FIG. 6A.

FIG. 5C is an explanatory diagram of a type code table 78 wherein the incomplete transaction of the type C is defined. The incomplete transaction of the type C is an unsettled transaction, wherein deferred payment sales are made for a specific customer, and is a deferred payment transaction on the principle of occurrence wherein the sale (transaction) amount is summed up with other transaction amounts upon occurrence (start) of the transaction. Therefore, in the type code table 78 for the deferred payment transaction and on the principle of occurrence, the type code C is defined. "Upon occurrence of transaction" is defined as a sum-up timing. "Unnecessary" is defined as a payment necessary/unnecessary flag because of the deferred payment transaction of deferred payment sales. "Predelivery" is defined as a delivery method, and further, "appointed day", as a default, is defined as a scheduled delivery date.

FIG. 5D is an explanatory diagram of a type code table 80 wherein the incomplete transaction of the type D is defined. The incomplete transaction of the type D is an unsettled transaction, wherein deferred payment sales are made for a specific customer, and is a deferred payment transaction on the principle of completion wherein the sale (transaction) amount is summed up with other transaction amounts upon completion of the transaction.

In correspondence to the unsettled transaction types A, B, C and D defined in the type code tables 74, 76, 78, and 80, in FIGS. 5A to 5D, the control functions of the type A management control unit 58, type B management control unit 60, type C management control unit 62, and type D management control unit 64 are provided for the management control unit 38 in FIG. 3. Each of the management control units 58, 60, 62 and 64 manages and controls all of the incomplete transactions separately with respect to the process at the time of prepayment wherein the incomplete transaction is started and the process wherein the goods delivery or the payment is made.

FIG. 6 is a fundamental flowchart for the control process with respect to the incomplete transaction by the transaction managing apparatus according to the invention of FIG. 3. First, when an incomplete operation key is depressed in order to declare the incomplete transaction by using the operation picture plane of the POS terminal, the key pressed (function selector) is determined in step S1. An incomplete transaction menu is displayed in step S2. When the incomplete transaction menu is displayed, two menus, "transaction upon payment" wherein the incomplete transaction is started and "transaction upon delivery" (including "transaction upon payment") wherein the incomplete transaction is completed, are displayed. When the menu "transaction upon payment", indicative of the start of the incomplete transaction, is selected, the processing routine advances from step S3 to step S4. The process upon payment according to the type designated at that time is executed. When the start of the incomplete transaction is not selected in step S3, whether the incomplete transaction delivery has been selected or not is determined in step S5. If the delivery is selected, step S6 follows and the process upon delivery according to the transaction slip number is executed. The processes in steps S1 to S6 are repeated until there is an end instruction to the POS terminal in step S7. When the incomplete operation key is not depressed in step S1, the processing routine advances to the process for the normal transaction (not shown).

(Deferred Pickup (Delivery) Transaction)

Figure 7:
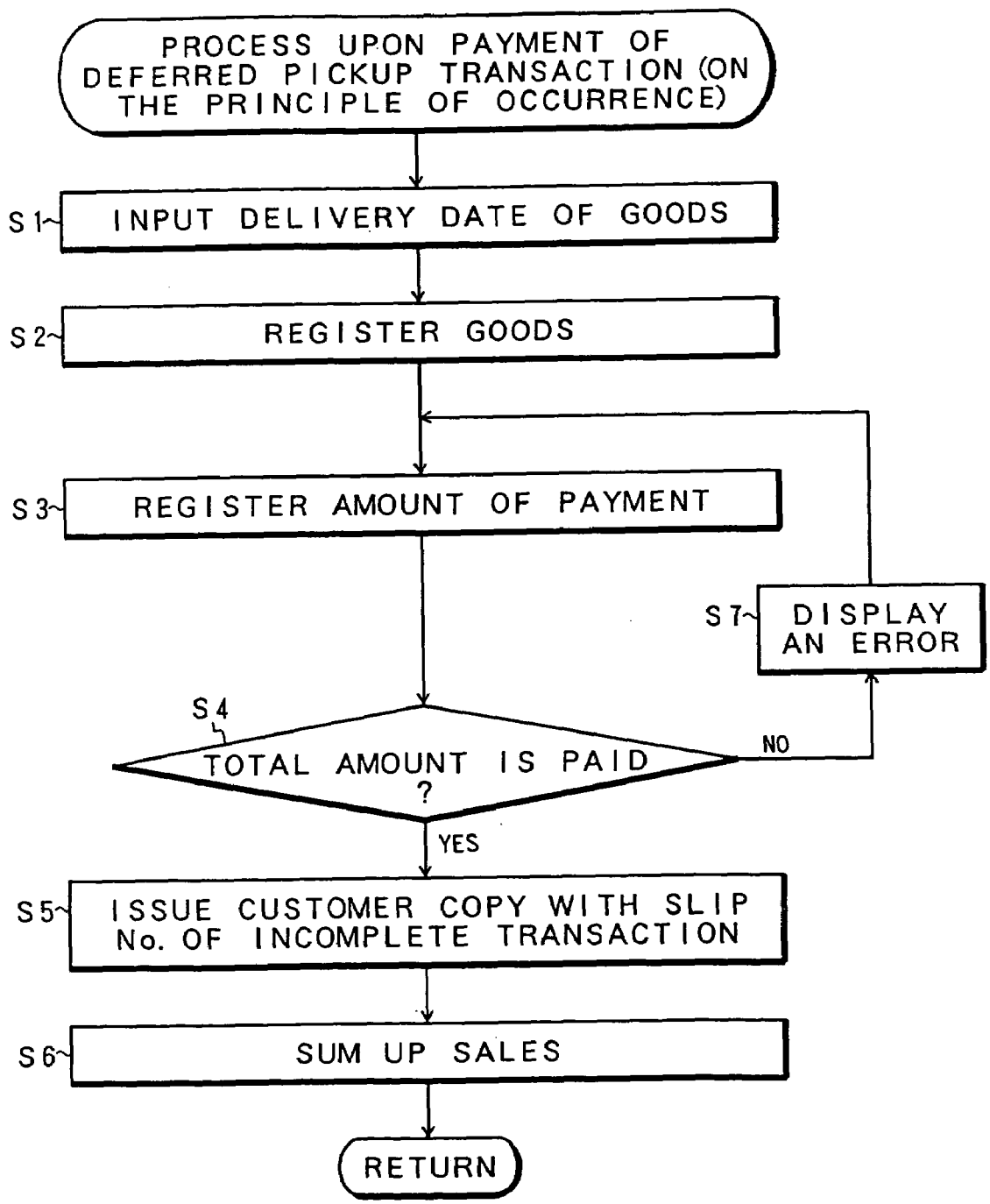
FIG. 7 is a flowchart for a paying process in a deferred pickup transaction on the principle of occurrence (type A)

FIG. 7 is a flowchart for a process upon prepayment in step S4 in FIG. 6 wherein the incomplete transaction type A, a deferred pickup transaction on the principle of occurrence, has been designated. In the process, upon payment for starting the transaction in the deferred pickup transaction on the principle of occurrence, first, in step S1, the delivery date of goods is inputted. As a delivery date of goods, "after 5 business days" is displayed as a default in the type code table 74 in FIG. 5A. If this date is wrong, it is corrected by a manual input, or the like. In step S2, the registration of goods using the bar code reader, or the like, is executed in a manner similar to the normal transaction. In step S3, the amount of payment is registered. In the deferred pickup transaction on the principle of occurrence of the type A, the prepayment necessary/unnecessary flag is set to "necessary (total amount)" with reference to the type code table 74 in FIG. 5A. Therefore, after the amount of payment was registered, whether the total amount has been paid or not is determined in step S4. If the total amount is not paid, an error is displayed in step S7. The registration of the amount of payment is executed again in step S4. If the total amount was paid in step S4, step S5 follows and a customer copy with the incomplete transaction slip number is issued by the printer. Finally, the sale (transaction) amount is summed up in step S6. That is, the sale (transaction) amount is summed up with other transaction amounts at the start of the incomplete transaction in the deferred pickup transaction on the principle of occurrence of the type A.

FIGS. 8A to 8D and 9 are explanatory diagrams of operation picture planes of the POS terminal in the process upon payment of the deferred pickup (delivery) transaction on the principle of occurrence in FIG. 7. FIG. 8A shows a sales registration picture plane 82 shown as an initial picture plane of the POS terminal. A bar code display frame 84 and a goods information list 85, which are used for the normal sales registration, are displayed in an empty state onto the sales registration picture plane 82. Further, a check box 86 for the incomplete transaction is provided on the lower side. In the normal sales registration, when a bar code scan of the goods is performed, a bar code (numeral) is automatically displayed in the bar code display frame 84 (it can be also manually inputted by a key input) and a name, a price, and the like, of the goods are displayed in the goods information list 85.

The declaration of the start of the incomplete transaction is made by selecting the check box 86 of the incomplete transaction on the sales registration picture plane 82. This selection may be made by clicking the mouse, depressing the operation key, pressing a touch panel, or the like, thereby inverting it to a state shown in black (hereinbelow, this operation is merely referred to as "selection of check box").

The screen is switched to an incomplete transaction menu picture plane 88 of FIG. 8B by the declaration of the start of the incomplete transaction. Check boxes 90 and 92 are provided on the incomplete transaction menu picture plane 88 with respect to the transaction upon payment and the transaction upon delivery. The check box 90 of the transaction upon payment is selected. The screen is switched to an incomplete transaction type selection picture plane 94 of FIG. 8C by the selection of the check box 90.

Check boxes 96, 98, 100 and 102 of the four types of incomplete transactions, the deferred pickup transaction (on the principle of occurrence), deferred payment transaction (on the principle of occurrence), deferred pickup transaction (on the principle of completion), and deferred payment transaction (on the principle of completion) are provided on the incomplete transaction type selection picture plane 94. Since the transaction is the deferred pickup (delivery) transaction on the principle of occurrence, the check box 96 is selected. Subsequently, the screen is switched to a delivery date input picture plane 104 in the deferred pickup transaction of FIG. 8D. Assuming that the current date of the start of the transaction is set to Sep. 23, 1999, "19990928", indicative of "after 5 business days" of the default, is displayed in an input frame 106 of the delivery date input picture plane 104. If a correction is necessary, the date is corrected by a manual input or the like.

In this state, the bar code of the goods is read by the bar code reader, or the like, the goods are registered, payment for the displayed price is received from the customer, payment registration is performed, and, in case of a total amount, a customer copy on which the incomplete transaction slip number has been recorded is issued by the printer. If the amount of payment at the time of the payment registration is not equal to the total amount, an error message, or the like, is displayed.

Figure 9:
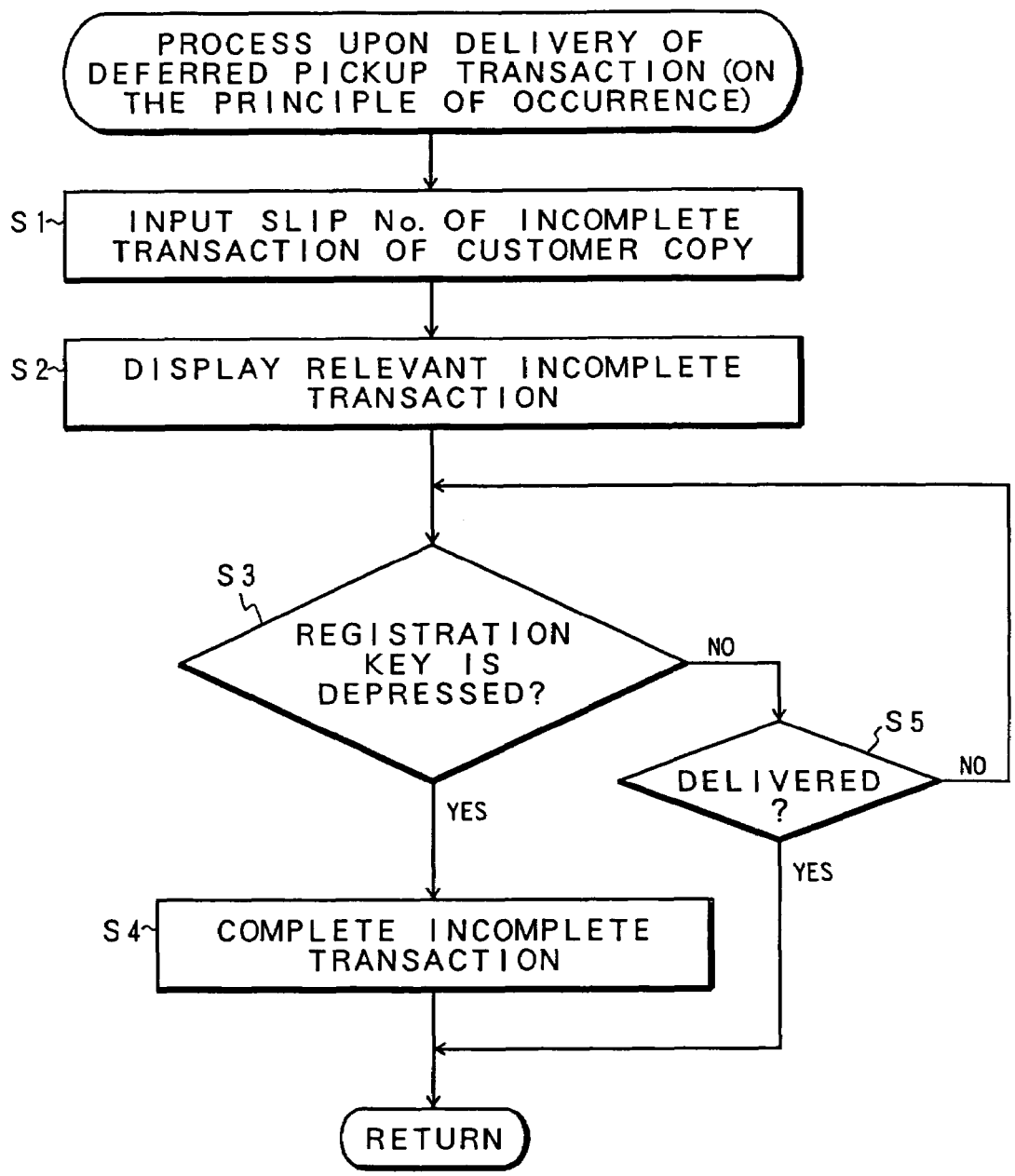
FIG. 9 is a flowchart for a delivering process in the deferred pickup transaction on the principle of occurrence (type A)

FIG. 9 is a flowchart for a process upon delivery which is performed after the process upon payment of the incomplete transaction type A in FIG. 7. In the process upon delivery, in step S1, the incomplete transaction slip number from the customer copy is inputted. On the basis of the input of the transaction slip number, the relevant incomplete transaction is displayed in step S2. The goods are delivered on the basis of the display contents and a registration key is depressed. When the registration key is depressed in step S3, step S4 follows and a process for completing the incomplete transaction is executed. With respect to the contents of the incomplete transaction displayed in step S2, if delivery of the goods has already been registered, an error display, or the like, is performed. Since the registration key is not selected, step S5 follows. Whether the delivery has been performed or not is determined from the registration contents. Thereafter, the processing routine finishes.

FIGS. 10A to 10E are explanatory diagrams of operation picture planes for the process upon delivery in the incomplete transaction type A in FIG. 9. When the declaration of the incomplete transaction on the sales registration picture plane in FIG. 10A is selected by the check box 86, since the screen is switched to the incomplete transaction menu picture plane 88 of FIG. 10B, the transaction upon delivery is designated by selecting the check box 92. Thus, the screen is switched to a transaction slip number input picture plane 108 of FIG. 10C. Therefore, by inputting the slip No. "0000001" recorded on the received customer copy slip, the screen is switched to an incomplete transaction confirmation picture plane 112 of FIG. 10D. Status display boxes 116 and 118 with respect to a sales date, a sales amount, a balance, a delivery date, completion of payment, and "delivered" are provided for the incomplete transaction confirmation picture plane 112 corresponding to the respective transaction slip number. When the registration key is operated, therefore, the status display box 118 of "delivered" is set to "delivered" and the incomplete transaction is finished. In the case where the screen is switched to an incomplete transaction confirmation picture plane 112 of FIG. 10E, when the transaction slip number is inputted in FIG. 10C, since the status display box 118 has already been set to "the goods have already been delivered", a message indicating this fact, or the like, is displayed and the process is finished.

FIG. 11 is a flowchart for a process upon payment in the deferred pickup (delivery) transaction on the principle of completion corresponding to the incomplete transaction type B. In the process upon payment in the deferred pickup transaction on the principle of completion, the check box 86 of the incomplete transaction is clicked on the sales registration picture plane 82 as shown in FIG. 8A, the check box 90 of the transaction upon payment is selected on the incomplete transaction menu picture plane 88 in FIG. 8B, and subsequently, the check box 100 of the deferred pickup transaction (on the principle of completion) is selected on the incomplete transaction type selection picture plane 94 of FIG. 8C, thereby activating such a process upon payment.

First, in step S1, the delivery date of goods is inputted by using the same delivery date input picture plane 104 as that of FIG. 8D. Also, in this case, "after 5 business days" as a default scheduled delivery date is set in the type code table 76 in FIG. 5B, is displayed. If it is necessary to correct the delivery date, it is corrected by a manual input, or the like. Subsequently, in step S2, a registration of the goods is performed by reading the bar code of the goods by using the bar code reader, or the like, in a manner similar to the case of the normal transaction.

An amount of payment is registered in step S3. In this case, since it is recognized from the type code table 76 in FIG. 5B that the prepayment is necessary and the total amount is necessary, when it is confirmed in step S4 that the total amount has been paid, a customer copy with the incomplete transaction slip number is issued in step S5. If the total amount is not paid in step S4, an error display or the like is provided in step S6. The registration of the paid amount from step S3 is executed again. In the process upon payment in the deferred pickup transaction on the principle of completion in FIG. 11, the sum-up of the sale (transaction) amount with other transaction amounts is deferred. Consequently, this process upon payment differs from the case of the deferred pickup (delivery) transaction on the principle of occurrence of the type A shown in FIG. 7.

Figure 12:
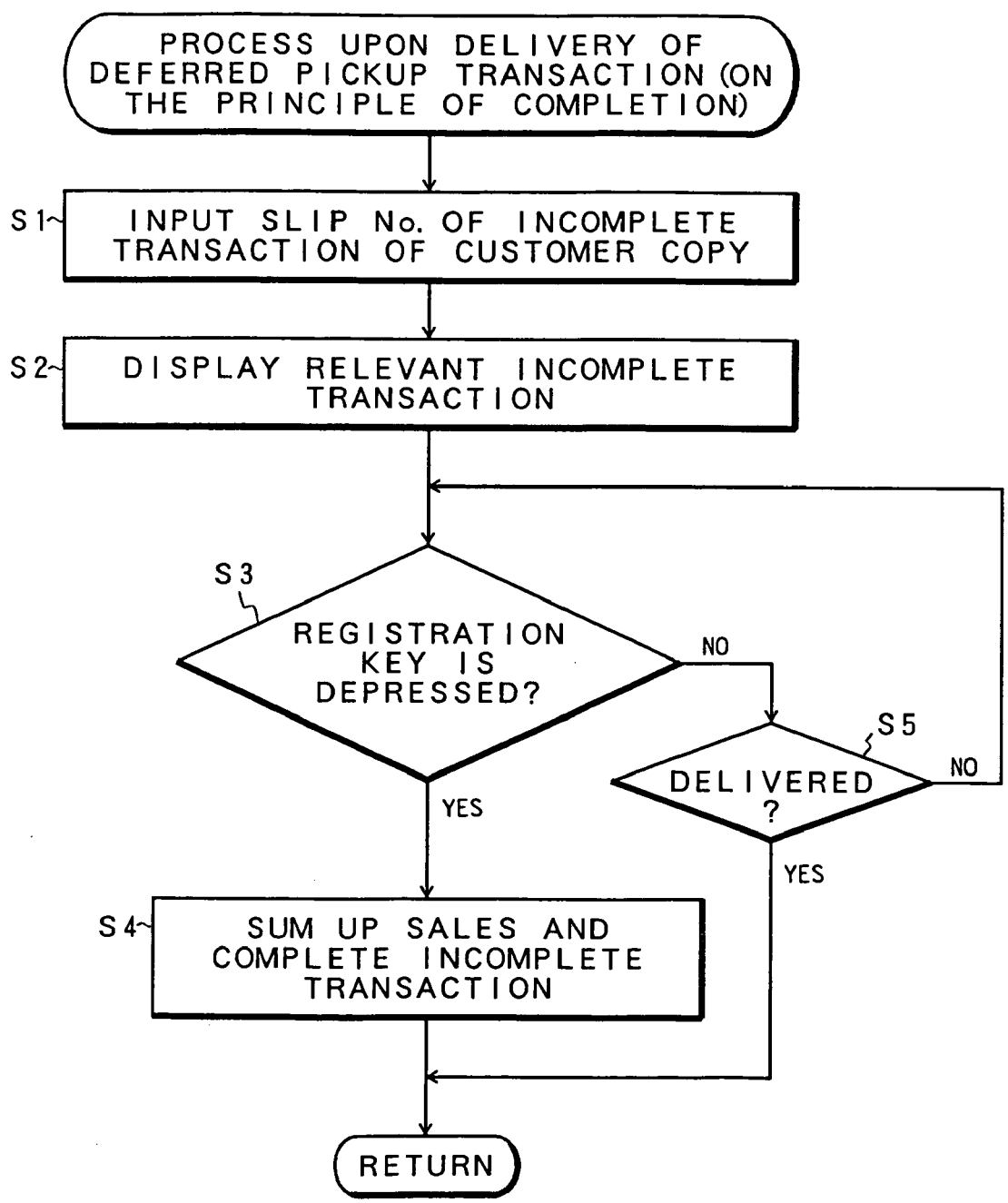
FIG. 12 is a flowchart for a delivering process in the deferred pickup transaction on the principle of completion (type B)

FIG. 12 is a flowchart for a process upon delivery in the deferred pickup (delivery) transaction on the principle of completion which is executed at the time of the delivery of goods after the process upon payment in FIG. 11. Also, in the process upon delivery, first, when the check box 86 of the incomplete transaction is selected on the same sales registration picture plane 82 as that of FIG. 10A and the check box 92 upon delivery is selected on the incomplete transaction menu picture plane 88 of FIG. 10B, the transaction slip number input picture plane 108 of FIG. 10C is displayed. By inputting the incomplete transaction slip number recorded on the customer copy in step S1, the incomplete transaction confirmation picture plane 112, similar to that of FIG. 10D, is displayed in step S2. After it is confirmed that the payment is not finished, by clicking the registration key, the processing routine advances from step S3 to step S4. At this time, the sale (transaction) amount is summed up with other transaction amounts and the incomplete transaction is completed. In the case where the confirmation display picture plane of the incomplete transaction in step S2 indicates that the status display box 118 indicates "delivered" as shown in FIG. 10E, the processing routine is finished.

(Deferred Payment Transaction)

FIG. 13 is a flowchart for a process upon payment in the case where the incomplete transaction type D as a deferred payment transaction on the principle of completion is selected in the embodiment of FIG. 3. In the registering process of the incomplete transaction type D, first, the check box of the incomplete transaction 86 is selected on the sales registration picture plane 82 as shown in FIG. 14A and the incomplete transaction is declared. Subsequently, the check box 92 of the transaction upon delivery is clicked by using the incomplete transaction menu picture plane 88 in FIG. 14B and the check box 102 of the deferred payment transaction (on the principle of completion) is selected with respect to the incomplete transaction type selection picture plane 94 of FIG. 14C, so that the process is started.

When the process is started, an input picture plane 115 of the delivery date of goods in FIG. 14D is displayed in step S1. The "delivery on the appointed day (19990923)", which has been set in the scheduled delivery date in the type code table 80 in FIG. 5D, is displayed as a default in a date input frame 115-1 on the input picture plane of the delivery date of goods. Subsequently, in step S2 in FIG. 13, the bar code of the goods is read by using the bar code reader, thereby registering the goods in a manner similar to the normal transaction. When the registration of the goods is finished, in this deferred payment transaction, since it is recognized from the type code table 80 in FIG. 5D that the delivery method has been set to "predelivery" and the scheduled delivery date has been set to "appointed day", an incomplete transaction confirmation picture plane 116-1 of FIG. 14E is displayed in order to confirm the delivery.

Therefore, it is confirmed that when the registration key is clicked with respect to the incomplete transaction confirmation picture plane 116-1, a status display box 126 of "delivered" on the incomplete transaction confirmation picture plane 116-1 is set to "delivered". An amount of payment is registered in step S4. In this deferred payment transaction, since it is valid, even if the amount of payment is equal to zero, the zero amount of payment is registered. A customer copy with the incomplete transaction slip number is issued in step S5. Since the deferred payment transaction is based on the principle of completion, the sum-up of the sales is deferred at this point of the process upon payment.

Figure 15:
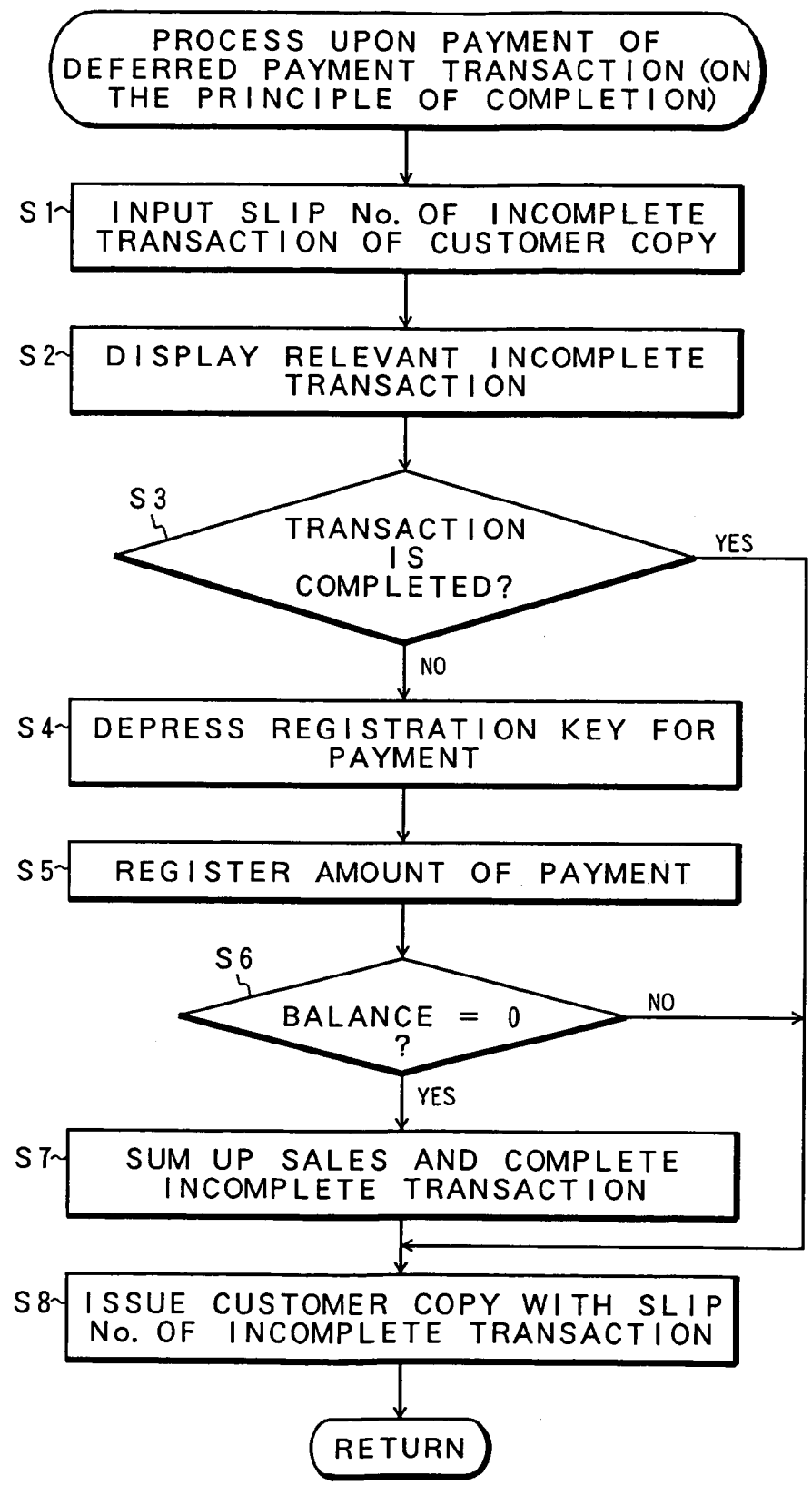
FIG. 15 is a flowchart for the paying process in the deferred payment transaction on the principle of completion (type D)

FIG. 15 shows a process upon payment in the incomplete transaction type D which is executed in the case where there is a balance in the process upon payment in FIG. 13. With respect to the process upon payment of the deferred payment transaction, the check box 86 of the incomplete transaction on the sales registration picture plane 82 is selected as shown in FIG. 16A, the incomplete transaction is declared, and the check box 92 of the transaction upon delivery is selected on the incomplete transaction menu picture plane 88 of FIG. 16B so that the screen is switched to the transaction slip number input picture plane 115 of FIG. 16C.

Therefore, in the paying process of the deferred payment transaction (on the principle of completion) in FIG. 15, first, when the incomplete transaction slip number recorded on the customer copy is inputted in step S1, an incomplete transaction confirmation picture plane 116-2 of FIG. 16D is displayed in step S2. Subsequently, in step S3, whether the transaction has been completed or not is determined. If NO, a balance on the incomplete transaction confirmation picture plane 116-2 is equal to, for example, "p25,000", as shown in FIG. 16D. Therefore, the registration key is clicked in step S4 for the purpose of payment. An amount of payment is registered in step S5. Whether the balance is equal to zero or not is now determined in step S6. If it is equal to zero, the sale (transaction) amount is summed up and the incomplete transaction is completed in step S7.

A customer copy with the incomplete transaction slip number is issued in step S8. When the transaction is completed in step S3, for example, in the case where a status display box 124 indicative of the zero balance and the completion of the payment and the check box 126 indicative of "paid and delivered" show the completion as shown on, for example, an incomplete transaction confirmation picture plane 116-3 of FIG. 16E, the processes in steps S4 to S7 are skipped. Since the process upon payment of the deferred payment process has already been finished, a customer copy with the incomplete transaction slip number is issued in step S8 and the processing routine is finished.

Figure 17:
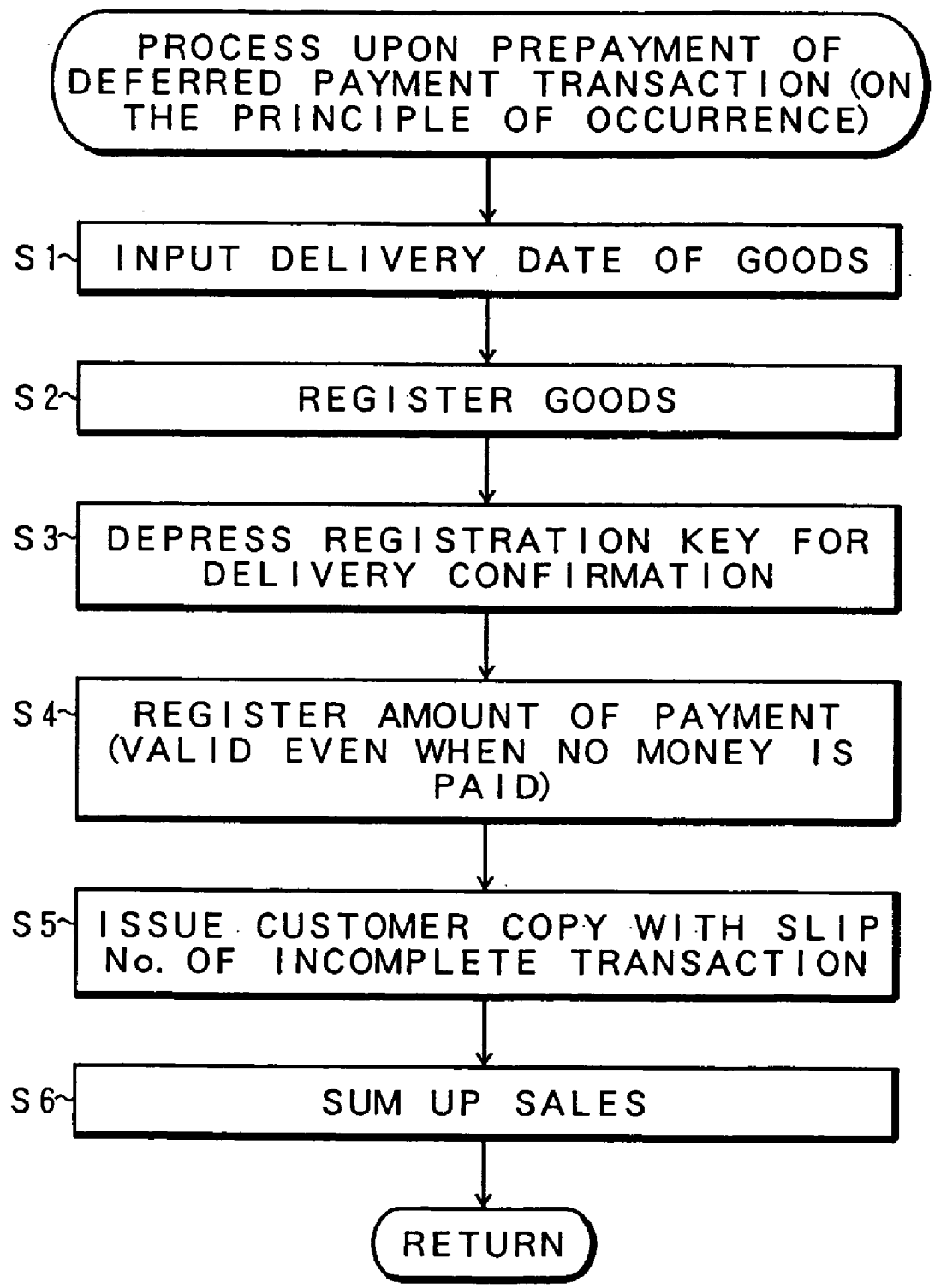
FIG. 17 is a flowchart for the paying process in a deferred payment transaction on the principle of occurrence (type C)

FIG. 17 is a flowchart for a process upon prepayment of the incomplete transaction type C as a deferred payment transaction on the principle of occurrence. The processes from the input of the delivery date of goods in step S1 to the issue of a customer copy with the incomplete transaction slip number in step S5 are substantially the same as those in steps S1 to S5 for the process upon payment in the incomplete transaction type D (deferred payment transaction on the principle of completion) of FIG. 13. Since the transaction is based on the principle of occurrence in addition to those processes, FIG. 17 differs from FIG. 13 with respect to a point that the sale (transaction) amount is summed up with other transactions in step S6.

Figure 18:
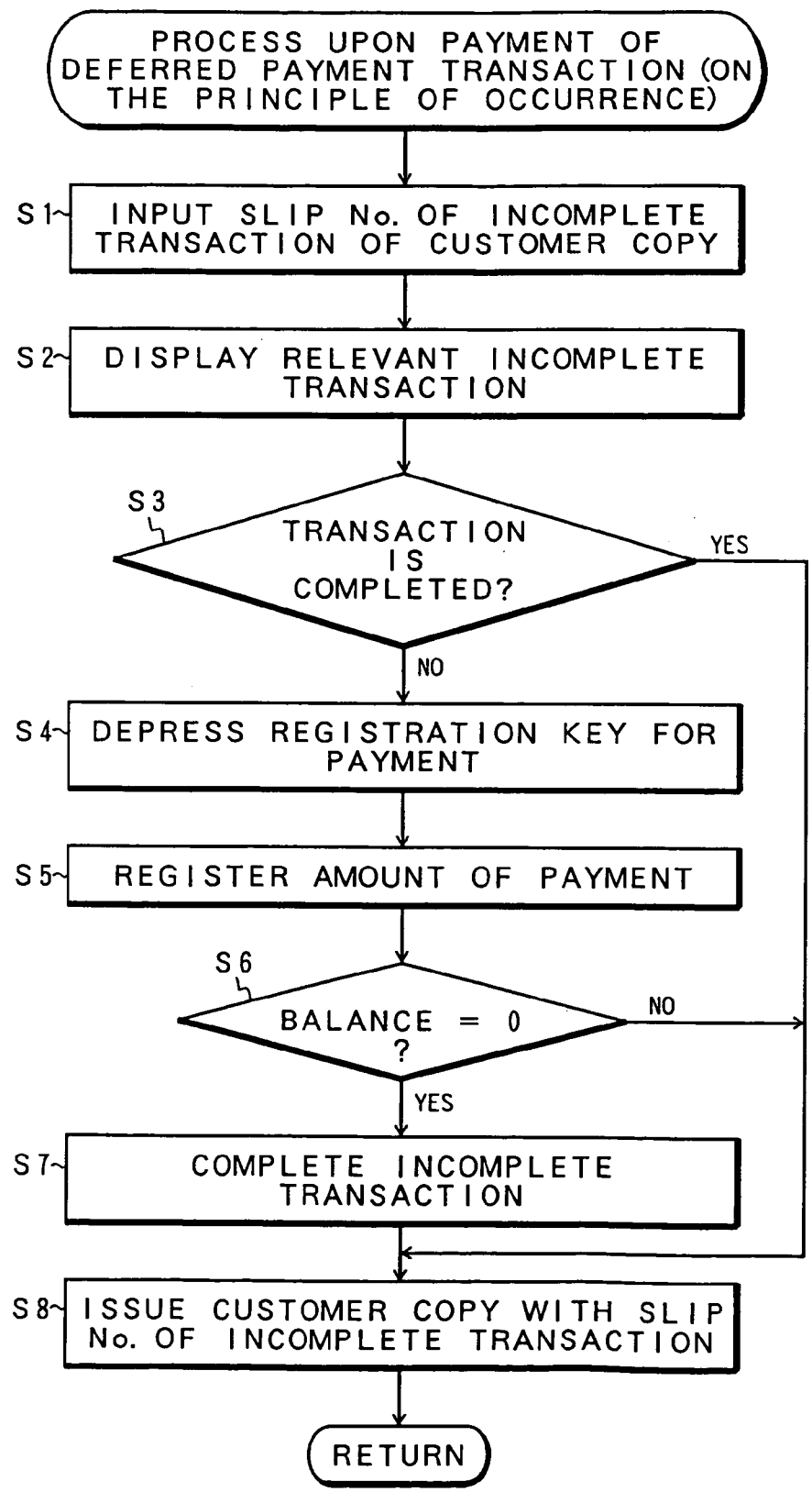
FIG. 18 is a flowchart for the paying process in the deferred payment transaction on the principle of occurrence (type C)

FIG. 18 is a flowchart for a process upon payment which is executed later (e.g., on another day) in the case where the balance is not equal to zero in the process upon payment in FIG. 17. Although the process upon payment is fundamentally the same as the process upon payment of the incomplete transaction type D (deferred payment process on the principle of completion) shown in FIG. 15, since the transaction is based on the principle of occurrence, FIG. 18 differs from FIG. 15 with respect that the incomplete transaction is completed without authorizing the summing up of the sale (transaction) amount in step S7. The other points are substantially the same as those in FIG. 15.

FIGS. 19A and 19B show specific examples of a list display which can be displayed by the transaction managing apparatus according to the invention in FIG. 3. In the transaction managing apparatus of the invention, with respect to the incomplete transactions which are managed, the contents of the incomplete transactions can be displayed as a list, for example, a complete list or by transaction type. FIG. 19A shows a list display with respect to all of the incomplete transactions. For example, all of the incomplete transactions as of Oct. 1, 1999, are displayed on an incomplete transaction list picture plane 128. In the list display, items of the slip number, date and time of occurrence, an amount of payment, and a type are displayed for every incomplete transaction. This list picture plane is scroll-displayed and results of totalization of the totals, the number of incomplete transactions, the number of transactions per type, the number of complete transactions, the number of delivery waiting transactions, the number of payment waiting transactions, and the like, also can be displayed on the final page.

FIG. 19B shows a display picture plane of a list of customers who do not come to receive the goods even after the expiration of the scheduled delivery date with regard to all of the incomplete transactions. A transaction slip number, date and time of occurrence, a scheduled delivery date, and a type are displayed on an undelivered customer list picture plane 132. Additionally, an incomplete transaction list picture plane and an undelivered customer list picture plane classified for each of the types A to D can be displayed. Further, also with respect to the late payment or non-payment customers who do not come to pay for the goods even after the expiration of the term for payment, lists of late payment or non-payment customers can be displayed for all of the incomplete transactions. Further, a list of payment situations can be displayed.

Figure 20A:
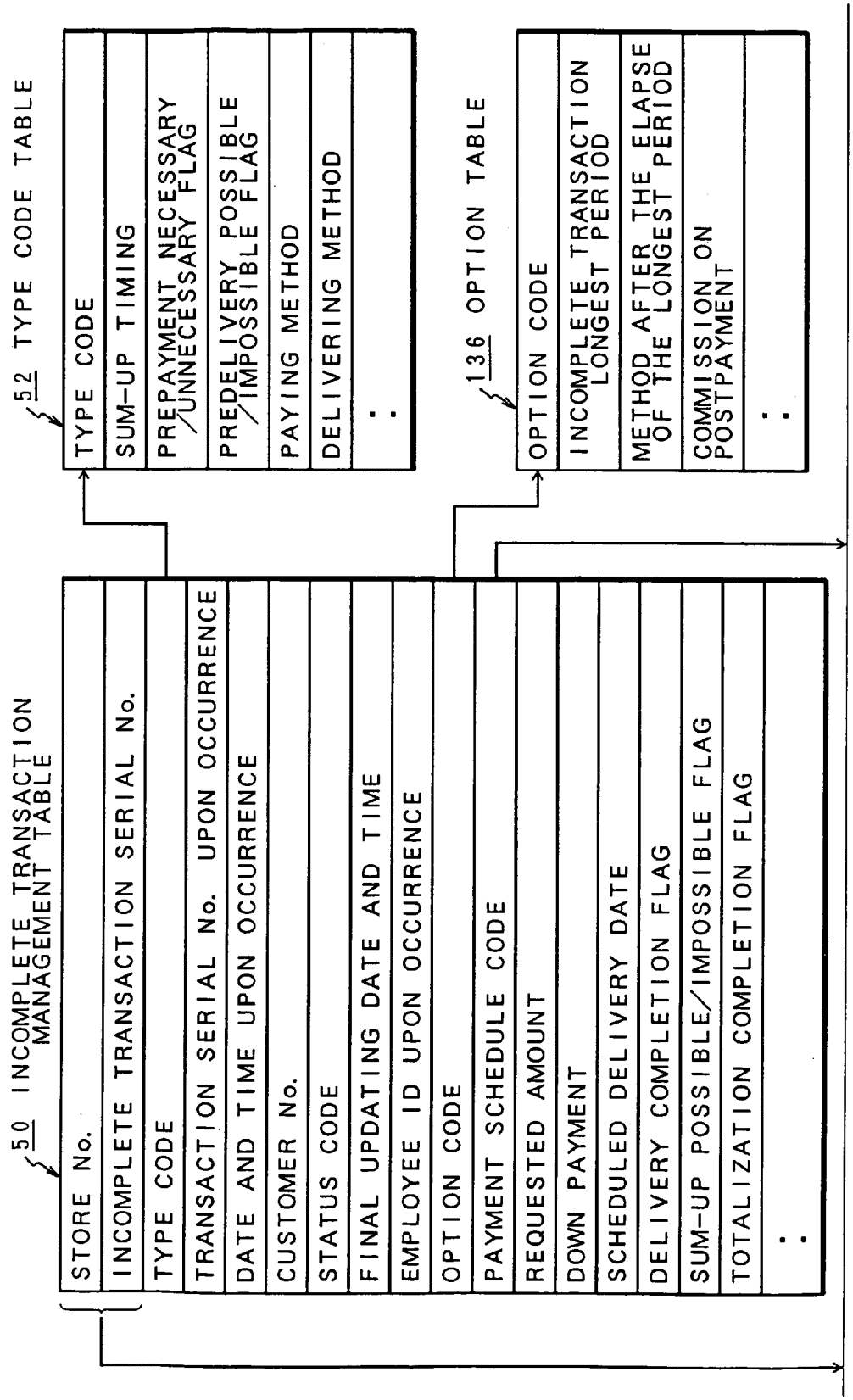

FIGS. 20A and 20B show another embodiment of a table structure which is provided for the transaction defining unit 36 in FIG. 3. In this table structure, an option table 136, a payment schedule information table 138, and a discount information table 140 are further added to the tables of FIGS. 4A and 4B. In association with them, an option code and a payment schedule code are newly added to the incomplete transaction management table 50. The option code is linked to the option table 136. Handling methods for the late payment or non-payment persons such as option code, incomplete transaction longest period, method after the elapse of the longest period, commission on postpayment, and the like, are defined in the option table 136.

The payment schedule code added to the incomplete transaction management table 50 is linked to the payment schedule information table 138. Information regarding the payment by installments, such as, payment schedule code, lowest percentage of prepayment, the number of paying times, term for payment, payment schedule, and the like, is defined in the payment schedule information table 138.

Further, subsequent to the store number and the incomplete transaction serial number, information regarding the discount, such as, line item number, discount information, and the like, is defined in the discount information table 140 which is linked by the store number and the incomplete transaction serial number in the incomplete transaction management table 50. As mentioned above, as a table structure of the transaction defining unit 36 in FIG. 3, the contents of the incomplete transaction can be defined in detail, as necessary, by the table structure with respect to a proper category of the incomplete transaction and, further, items which determine the transaction contents. The item contents of each table can be properly defined, as necessary, in accordance with the contents of the incomplete transaction.

As described above, according to the present invention, a plurality of kinds of incomplete transaction types are defined in combination with a plurality of predetermined categories. One of the incomplete transaction types is designated by interactive operation with the operator, and the processes from the start of the transactions to the end can be managed and controlled so that a batch control and a batch management of a plurality of incomplete transactions can be performed by one system. Therefore, management of all of the incomplete transactions, understanding situations thereof, and the like, which have been difficult so far can be accurately performed in an extremely short time. Further, since the incomplete transactions are classified into types according to the combination of the categories, the management control method of the incomplete transaction can be accurately changed in a short time merely by designating the type.

Although the above embodiment relates to the example of the transactions of four incomplete transaction types A to D defined by the type code table in FIGS. 5A to 5D, the incomplete transaction type can be arbitrarily determined, as necessary, by a plurality of combinations of the categories including at least the sum-up timing, prepayment necessary/unnecessary flag, and delivery method/timing. In practice, the invention is not limited to the case of a plurality of types of incomplete transactions, but there is also a case where it has an incomplete transaction of only a specific type. In such a case, therefore, the processes regarding the incomplete transaction of the type previously defined are executed merely by declaration of the incomplete transaction.

The invention further provides a computer-readable recording medium on which an incomplete transaction managing program has been recorded. Therefore, as a recording medium for this purpose, a proper portable recording medium such as FD, CD-ROM, DVD, or the like, can be used. A program for an incomplete transaction, which is stored in the recording medium, has the function of the transaction defining unit 36 and the function of the management control unit 38 in FIGS. 4A and 4B. In this case, since the transaction defining unit 36 is realized by, for example, the retail application frame work technology 30 in FIG. 2, an independent program in this portion can be realized. Since the program for the management control unit 38 is realized as a POS application 28, an independent program in this portion can be realized.

The invention incorporates many modifications and variations without departing from the objects and advantages of the invention. Further, the invention is not limited by the numerical values shown in the embodiment.

What is claimed is:

1. A transaction managing apparatus used for a POS terminal, comprising:

a transaction defining unit which defines a deferred delivery transaction on a principle of occurrence and a deferred delivery transaction on a principle of completion, the transaction defining unit defines the deferred delivery transaction on the principle of occurrence by setting sum-up of a transaction amount with other transaction amounts to upon start of the transaction, prepayment of the total amount to necessary, and delivery of goods to postdelivery with respect to payment, and the transaction defining unit defines the deferred delivery transaction on the principle of completion by setting sum-up of the transaction amount with other transaction amounts to upon completion of the transaction, prepayment of a total amount to necessary, and delivery of goods to postdelivery with respect to payment; and a management control unit, in a case where said deferred delivery transaction on the principle of occurrence is selected as an unsettled transaction, the management control unit, upon payment, issues an incomplete transaction slip number, receives as an input a delivery date of goods, receives as an input a registration of goods, receives as an input a registration of an amount of payment, confirms payment of a total amount, outputs data for a customer copy with said slip number, and outputs data that indicates that the transaction amount is to be summed-up with amounts from other transactions, and upon delivery, outputs incomplete transaction information after receipt of an input of the slip number, receives as an input a registration of a delivery, and outputs data that indicates that the unsettled transaction is complete, in a case where said deferred delivery transaction on the principle of completion is selected as the unsettled transaction, the management control unit, upon prepayment, issues an incomplete transaction slip number, receives as an input a delivery date of goods, receives as an input a registration of goods, receives as an input a registration of an amount of payment, confirms payment of a total amount, and outputs data for a customer copy with said slip number; and upon delivery, outputs incomplete transaction information after receipt of an input of the slip number, receives as an input a registration of a delivery, outputs data that indicates that the transaction amount is to be summed-up with amounts from other transactions and outputs data that indicates that the unsettled transaction is complete.

2. A transaction managing apparatus used for a POS terminal, comprising:

a transaction defining unit which defines a deferred payment transaction on a principle of occurrence and a deferred payment transaction on a principle of completion, the transaction defining unit defines the deferred payment transaction on the principle of occurrence by setting sum-up timing of a transaction amount with other transaction amounts to upon start of the transaction, prepayment to unnecessary, and delivery of goods to predelivery with respect to payment, the transaction defining unit defines the deferred payment transaction on the principle of completion by setting sum-up timing of the transaction amount with other transaction amounts to upon completion of the transaction, prepayment to unnecessary, and delivery of goods to a predelivery with respect to payment; and a management control unit, in a case where said deferred payment transaction on the principle of occurrence is selected as an unsettled transaction, the management control unit, upon delivery, issues an incomplete transaction slip number, receives as an input a delivery date of goods, receives as an input a registration of goods, receives as an input a registration of an amount of payment including a zero payment, outputs data for a customer copy with said slip number, outputs data that indicates that the transaction amount is to be summed-up with amounts from other transactions and receives as an input a registration of a delivery; and upon payment, outputs incomplete transaction information after receipt of the input of said slip number, receives as an input a registration of an amount of payment, and in case of a zero balance, outputs data that indicates that the unsettled transaction is complete, in a case where said deferred payment transaction on the principle of completion is selected as the unsettled transaction, the management control unit, upon delivery, issues an incomplete transaction slip number, receives as an input a delivery date of goods, receives as an input a registration of goods, receives as an input a registration of an amount of payment including a zero payment, outputs data for a customer copy with said slip number, and receives as an input a registration of a delivery; and upon payment, outputs incomplete transaction information after receipt of the input of said slip number, receives as an input a registration of an amount of payment, and in case of a zero balance, outputs data that indicates that the unsettled transaction is complete and outputs data that indicates that the transaction amount is to be summed-up with amounts from other transactions.

3. A transaction managing apparatus used for a POS terminal, comprising:

a transaction defining unit which defines a deferred delivery transaction on a principle of occurrence, a deferred delivery transaction on a principle of completion, a deferred payment transaction on a principle of occurrence, and a deferred payment transaction on a principle of completion, the transaction defining unit defines the deferred delivery transaction on the principle of occurrence by setting sum-up of a transaction amount with other transaction amounts to upon start of the transaction, prepayment of the total amount to necessary, and delivery of goods to postdelivery with respect to payment, the transaction defining unit defines the deferred delivery transaction on the principle of completion by setting sum-up of a transaction amount with other transaction amounts to upon completion of the transaction, prepayment of a total amount to necessary, and delivery of goods to postdelivery with respect to payment, the transaction defining unit defines the deferred payment transaction on the principle of occurrence by setting sum-up timing of a transaction amount with other transaction amounts to upon start of the transaction, prepayment to unnecessary, and delivery of goods to predelivery with respect to payment, and the transaction defining unit defines the deferred payment transaction on the principle of completion by setting sum-up timing of a transaction amount with other transaction amounts to upon completion of the transaction, prepayment to unnecessary, and delivery of goods to a predelivery with respect to payment; and a management control unit, in a case where said deferred delivery transaction on the principle of occurrence is selected as an unsettled transaction, the management control unit, upon payment, issues an incomplete transaction slip number, receives as an input a delivery date of goods, receives as an input a registration of goods, receives as an input a registration of an amount of payment, confirms payment of a total amount, outputs data for a customer copy with said slip number, and outputs data that indicates that the transaction amount is to be summed-up with amounts from other transactions, and upon delivery, outputs incomplete transaction information after receipt of an input of the slip number, receives as an input a registration of a delivery, and outputs data that indicates that the unsettled transaction is complete, in a case where said deferred delivery transaction on the principle of completion is selected as the unsettled transaction, the management control unit, upon prepayment, issues an incomplete transaction slip number, receives as an input a delivery date of goods, receives as an input a registration of goods, receives as an input a registration of an amount of payment, confirms payment of a total amount, and outputs data for a customer copy with said slip number; and upon delivery, outputs incomplete transaction information after receipt of an input of the slip number, receives as an input a registration of a delivery, outputs data that indicates that the transaction amount is to be summed-up with amounts from other transactions and outputs data that indicates that the unsettled transaction is complete, in a case where said deferred payment transaction on the principle of occurrence is selected as the unsettled transaction, the management control unit, upon delivery, issues an incomplete transaction slip number, receives as an input a delivery date of goods, receives as an input a registration of goods, receives as an input a registration of an amount of payment including a zero payment, outputs data for a customer copy with said slip number, outputs data that indicates that the transaction amount is to be summed-up with amounts from other transactions and receives as an input a registration of a delivery; and upon payment, outputs incomplete transaction information after receipt of the input of said slip number, receives as an input a registration of an amount of payment, and in case of a zero balance, outputs data that indicates that the unsettled transaction is complete, and in a case where said deferred payment transaction on the principle of completion is selected as the unsettled transaction, the management control unit, upon delivery, issues an incomplete transaction slip number, receives as an input a delivery date of goods, receives as an input a registration of goods, receives as an input a registration of an amount of payment including a zero payment, outputs data for a customer copy with said slip number, and receives as an input a registration of a delivery; and upon payment, outputs incomplete transaction information after receipt of the input of said slip number, receives as an input a registration of an amount of payment, and in case of a zero balance, outputs data that indicates that the unsettled transaction is complete and outputs data that indicates that the transaction amount is to be summed-up with amounts from other transactions.

* * * * *